(12) United States Patent
Keith

(10) Patent No.: US 6,629,097 B1
(45) Date of Patent: Sep. 30, 2003

(54) DISPLAYING IMPLICIT ASSOCIATIONS AMONG ITEMS IN LOOSELY-STRUCTURED DATA SETS

(75) Inventor: Douglas K. Keith, 675 Sylvan Way, Redwood City, CA (US) 94062

(73) Assignee: Douglas K. Keith, Redwood City, CA (US)

( * ) Notice: Subject to any disclaimer, the term of this patent is extended or adjusted under 35 U.S.C. 154(b) by 0 days.

(21) Appl. No.: 09/550,409

(22) Filed: Apr. 14, 2000

Related U.S. Application Data

(60) Provisional application No. 60/149,093, filed on Aug. 16, 1999, and provisional application No. 60/131,411, filed on Apr. 28, 1999.

(51) Int. Cl.[7] .......................... G06F 17/30; G06F 7/00; G09G 5/00
(52) U.S. Cl. .................. 707/5; 707/2; 345/848
(58) Field of Search ................. 707/104, 103, 707/513, 2, 3, 5, 10, 1, 6, 7, 9; 345/356

(56) References Cited

U.S. PATENT DOCUMENTS

| | | | |
|---|---|---|---|
| 4,839,853 A | | 6/1989 | Deerwester |
| 5,021,976 A | * | 6/1991 | Wexelblat et al. .......... 345/853 |
| 5,325,298 A | | 6/1994 | Gallant |

(List continued on next page.)

OTHER PUBLICATIONS

Hoffman, D.L. and Franke, G.R. (1986) Correspondence Analysis; Graphical Representation of Catergorical Data in Marketing Research, Journal of Marketing Research, 23, pp. 213–227.*
Koll, Mathew B. (1979) Weird: An Approach to Concept–Based Information Retrieval, 13, pp. 32–50.*
Keith, D. Refining Concept Maps: Methodological Issues and an Example, Evaluation and Program Planning, 1989, pp. 75–80, vol. 12, Pergamon Press plc.
Trochim, W., An Introduction to Concept Mapping for Planning and Evaluation, Evaluation and Program Planning, 1989, pp. 1–16, vol. 12, Pergamon Press plc.
Wise, J.A., Thomas, J.J., Pennock, K., Lantrip, D., Pottier, M., Schur, A., Grow, V., Visualizing the Non–Visual: Spacial analysis and interaction with information from text documents, Proceedings of IEEE 95 Information Visualization, Oct. 1995, pp. 51–58, IEEE.
Hoffman, D.L. and Franke, G.R. (1986) Correspondence Analysis: Graphical Representation of Categorical Data in Marketing Research, Journal of Marketing Research, 23, pp. 213–227.

(List continued on next page.)

*Primary Examiner*—Safet Metjahic
*Assistant Examiner*—Merilyn P. Nguyen
(74) *Attorney, Agent, or Firm*—Robert M. Hunter

(57) ABSTRACT

A system for discerning and displaying relational structure and conceptual similarities among items in a target group of data items. Root terms are extracted from descriptions of the data items, and are used to generate similarity measures among all data items in the group. The invention uses a combination of mathematical operations to transform the similarity measures into Euclidean coordinates such that all data items and all root terms can be simultaneously plotted as visual objects in a computer-simulated three-dimensional space. Interpoint distances between data objects and root term objects correspond to the measures of associative similarity between those points. Three-dimensional graphics and movement simulation allow the data display to be presented and viewed from an unlimited number of perspectives. Users can access detailed information about displayed data items, including hyperlinks and URL links which serve to connect the user immediately to the original data sources represented by is objects in the visual plot. The invention can be applied across a broad range of circumstances in which surfacing of the implicit conceptual and relational structure among a group of data items is desired.

32 Claims, 17 Drawing Sheets

U.S. PATENT DOCUMENTS

| | | | |
|---|---|---|---|
| 5,559,940 A | | 9/1996 | Hutson |
| 5,619,709 A | | 4/1997 | Caid |
| 5,675,819 A | * | 10/1997 | Schuetze ..................... 704/10 |
| 5,761,685 A | | 6/1998 | Hutson |
| 5,774,888 A | * | 6/1998 | Light ............................ 707/1 |
| 5,778,362 A | | 7/1998 | Deerwester |
| 5,794,178 A | | 8/1998 | Caid |
| 5,832,494 A | | 11/1998 | Egger |
| 5,835,905 A | | 11/1998 | Pirolli |
| 5,847,708 A | | 12/1998 | Wolff |
| 5,883,635 A | | 3/1999 | Rao |
| 5,895,470 A | | 4/1999 | Pirolli |
| 5,917,500 A | | 6/1999 | Johnson |
| 5,924,105 A | * | 7/1999 | Punch et al. ................... 704/7 |
| 5,926,812 A | | 7/1999 | Hilsenrath |
| 6,026,388 A | * | 2/2000 | Liddy et al. ................... 704/9 |
| 6,038,561 A | * | 3/2000 | Snyder et al. ................ 707/10 |
| 6,154,213 A | * | 11/2000 | Rennison et al. ........... 345/428 |

OTHER PUBLICATIONS

Carroll, J.D., Green, P.E. and Schaffer, C.M. (1986) Interpoint Distance Comparisons in Correspondence Analysis, Journal of Marketing Research, 23, pp. 271–28.

Carroll, J.D, Green, P.E. and Schaffer, C.M. (1987) Comparing Interpoint Distances in Correspondeance Analysis: A Clarification, Journal of Marketing Research, 24, pp. 445–450.

Hoffman, D.L., De Leeuw, J. and Arjunji, R.V. (1994) Multiple Correspondence Analysis in R. Bagozzi (Ed.), Advanced Methods of Marketing Research, pp. 260–294, Malden, Massachusetts: Blackwell Publishers Inc.

Rao, R. and Sprague, Jr., R.H. (1998) Natural Technologies for Knowledge Work: Information Visualization and Knowledge Extraction in Journal of Knowledge Management, 2(2), pp. 1–14.

Lawton, G. (1999) Building the New Knowledge Interface, Knowledge Management, pp. 1–16.

Koprowski, G. (1995) New Markets Plugged In, http://www.wtonline.com/archive/1995_November_9/new_mkts/new_mkts1.html, pp1–2.

Pacific Northwest National Laboratory (1999) SPIRE—Spacial Paradigm for Information Retrieval and Exploration, http://multimedia.pnl.gov:2080/infoviz/spire/spire.html, all pages (unnumbered).

Cartia, Inc. (1999) Mapping the Information Landscape, http://www.cartia.com, all pages (unnumbered).

Cartia, Inc. (1999) NewsMap.com, http://www.newsmaps.com, all pages (unnumbered).

* cited by examiner

Figure 1:
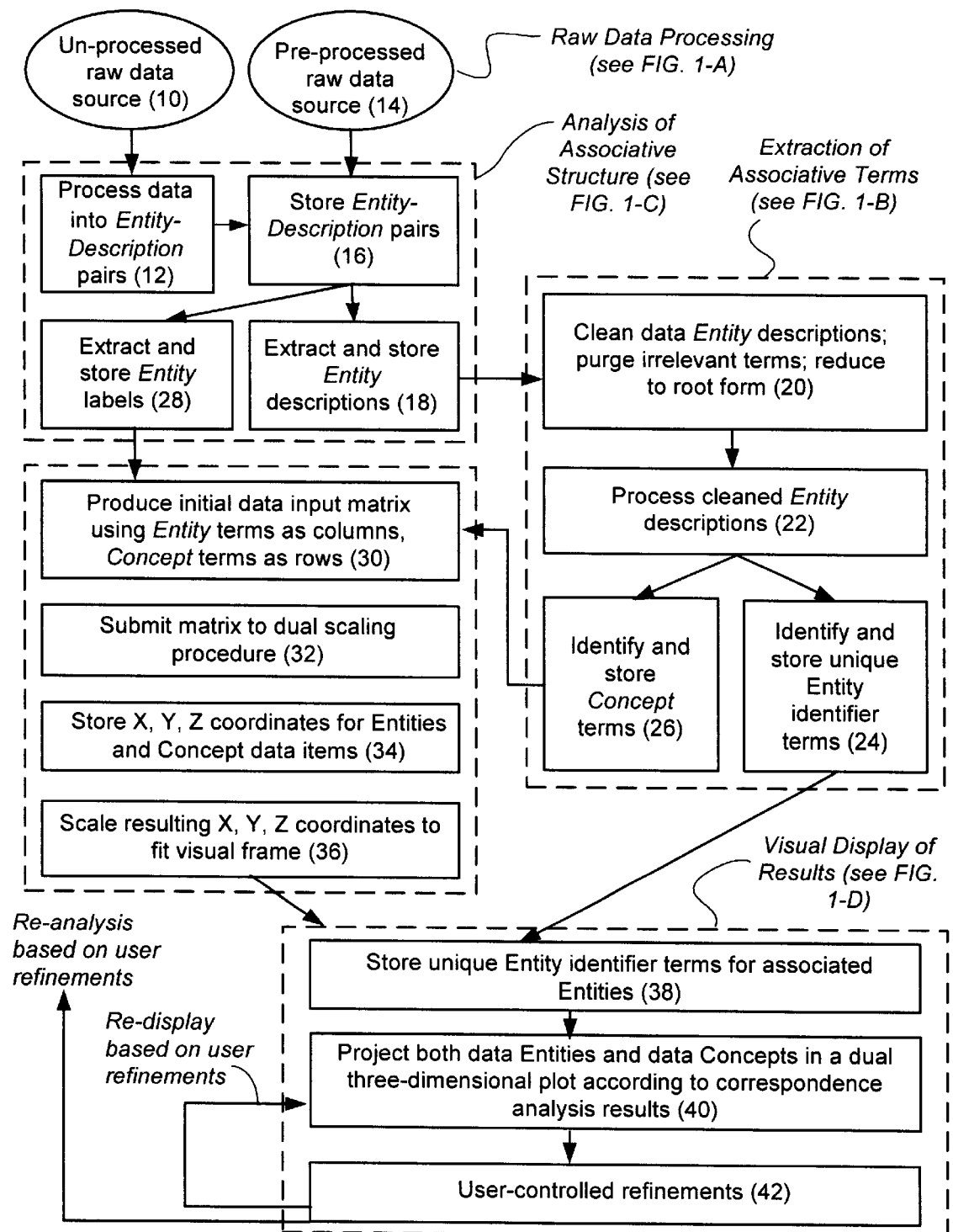

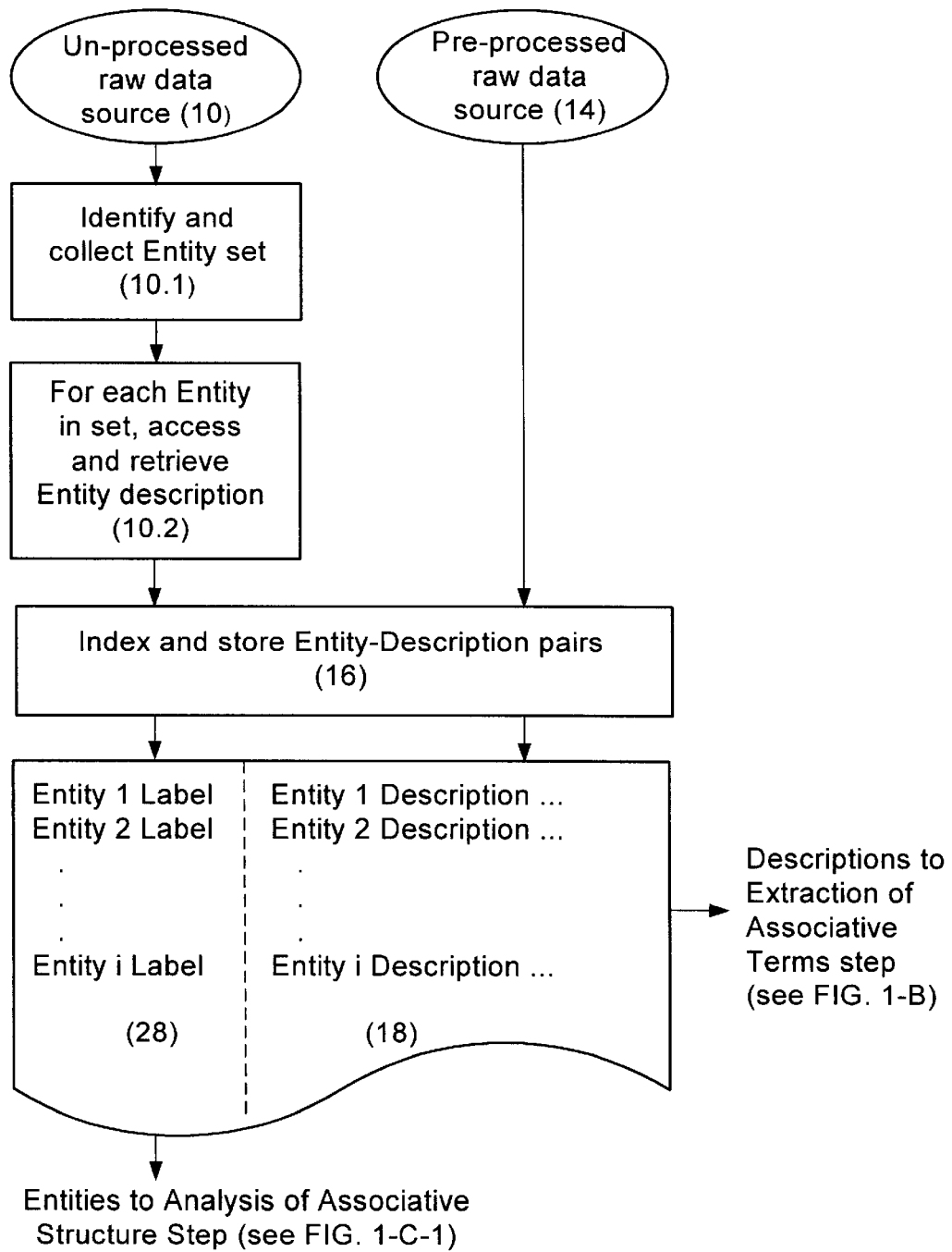
FIG. 1-A

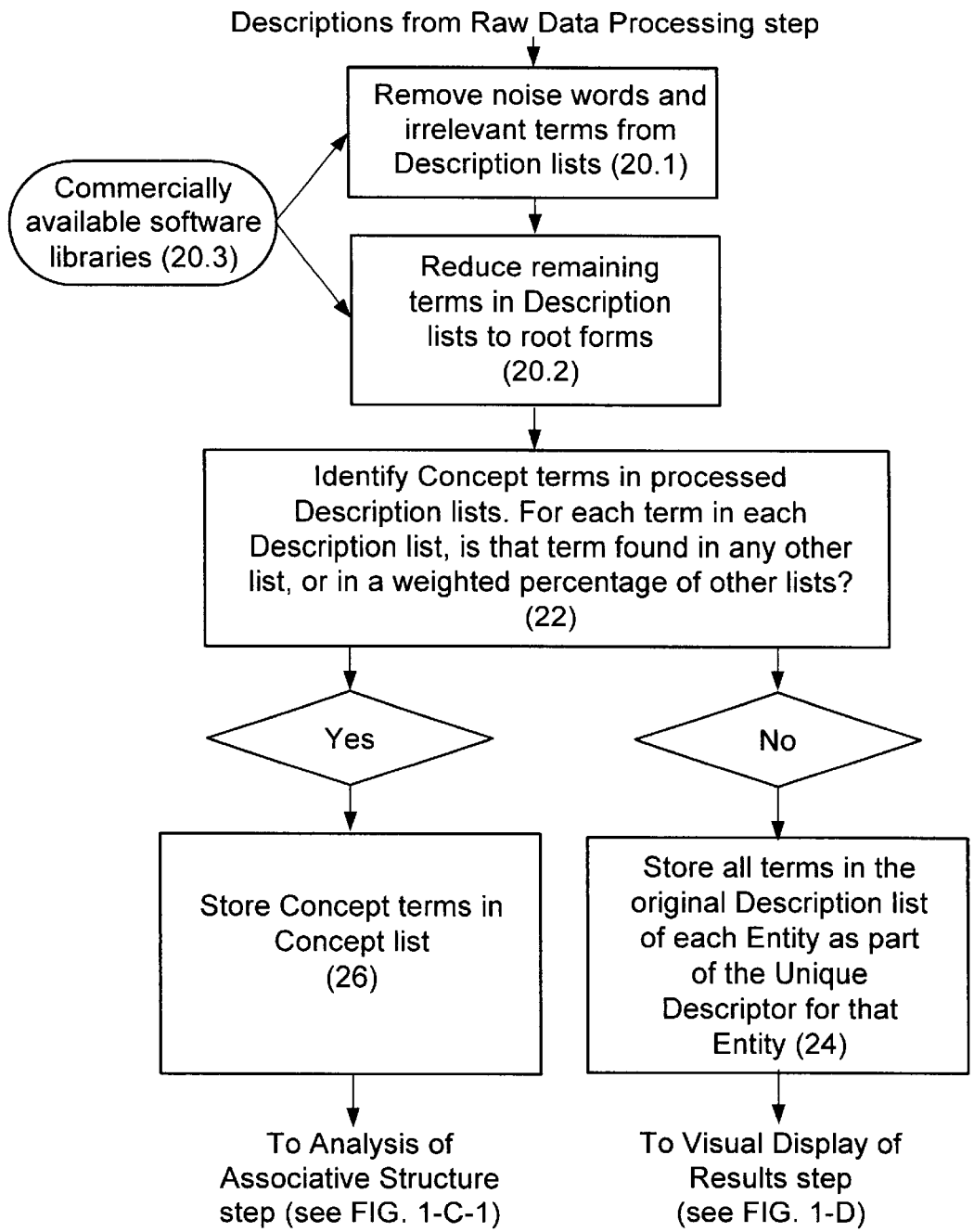
FIG. 1-B

Descriptions from Raw Data
Processing step (see FIG. 1-A)
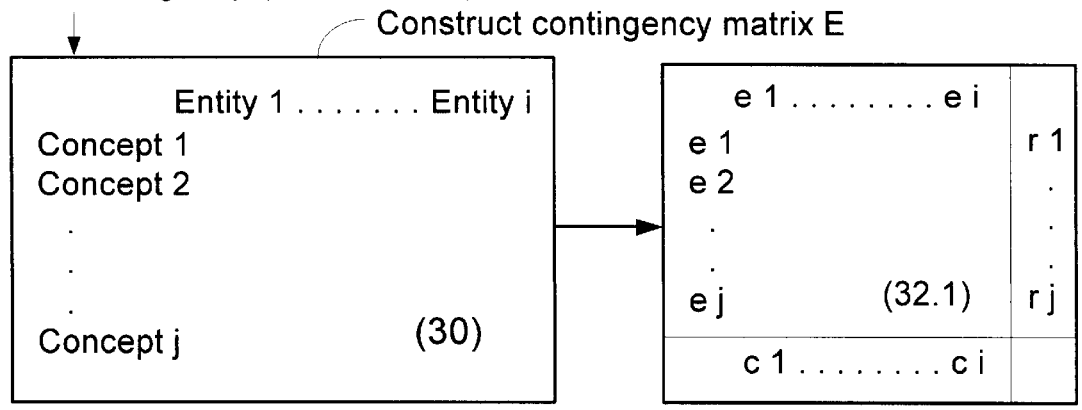
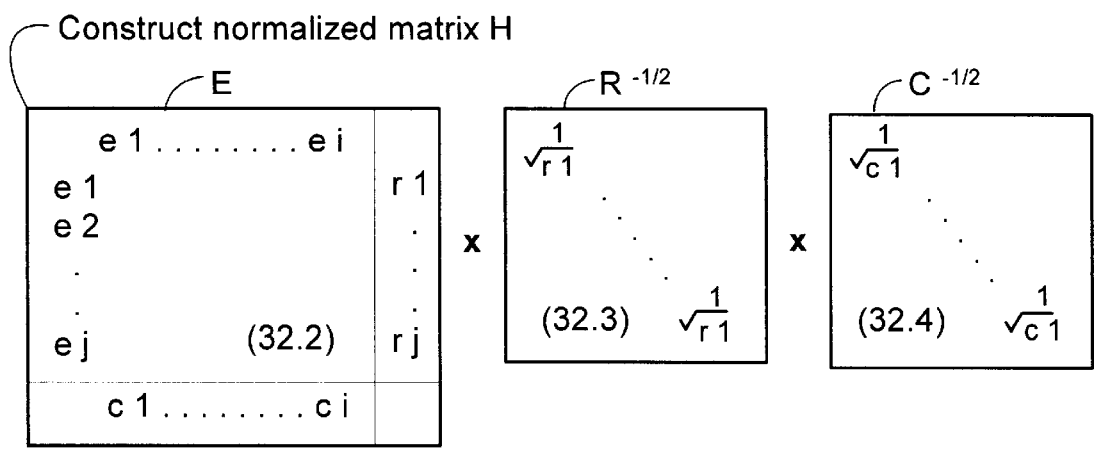
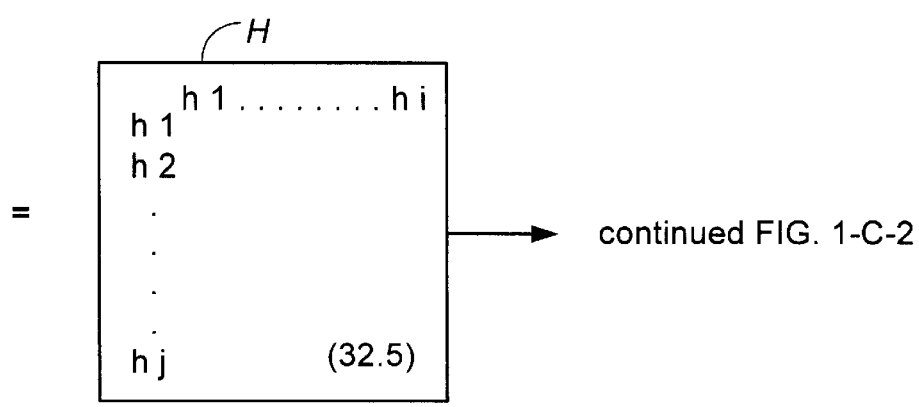
FIG. 1-C-1

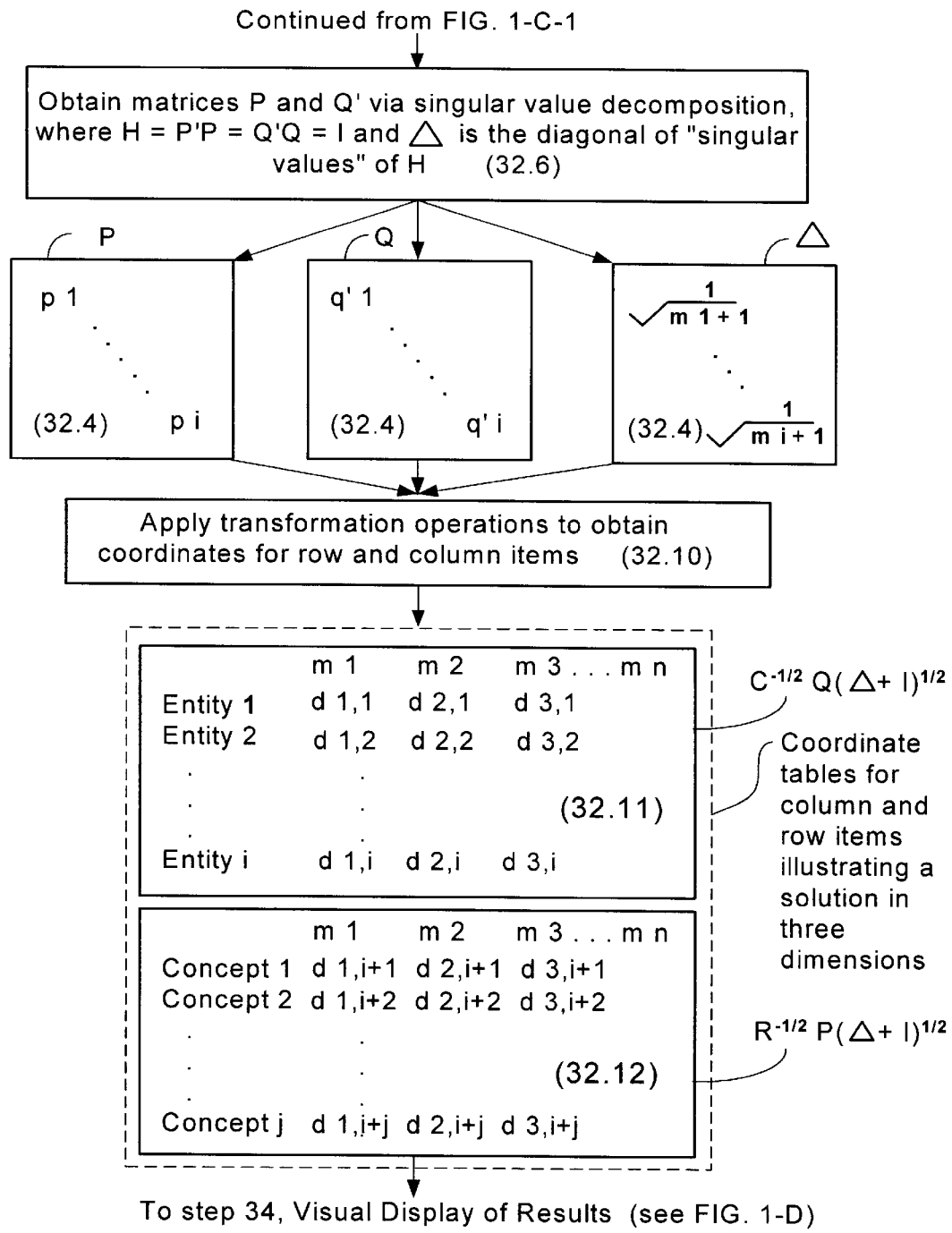
FIG. 1-C-2

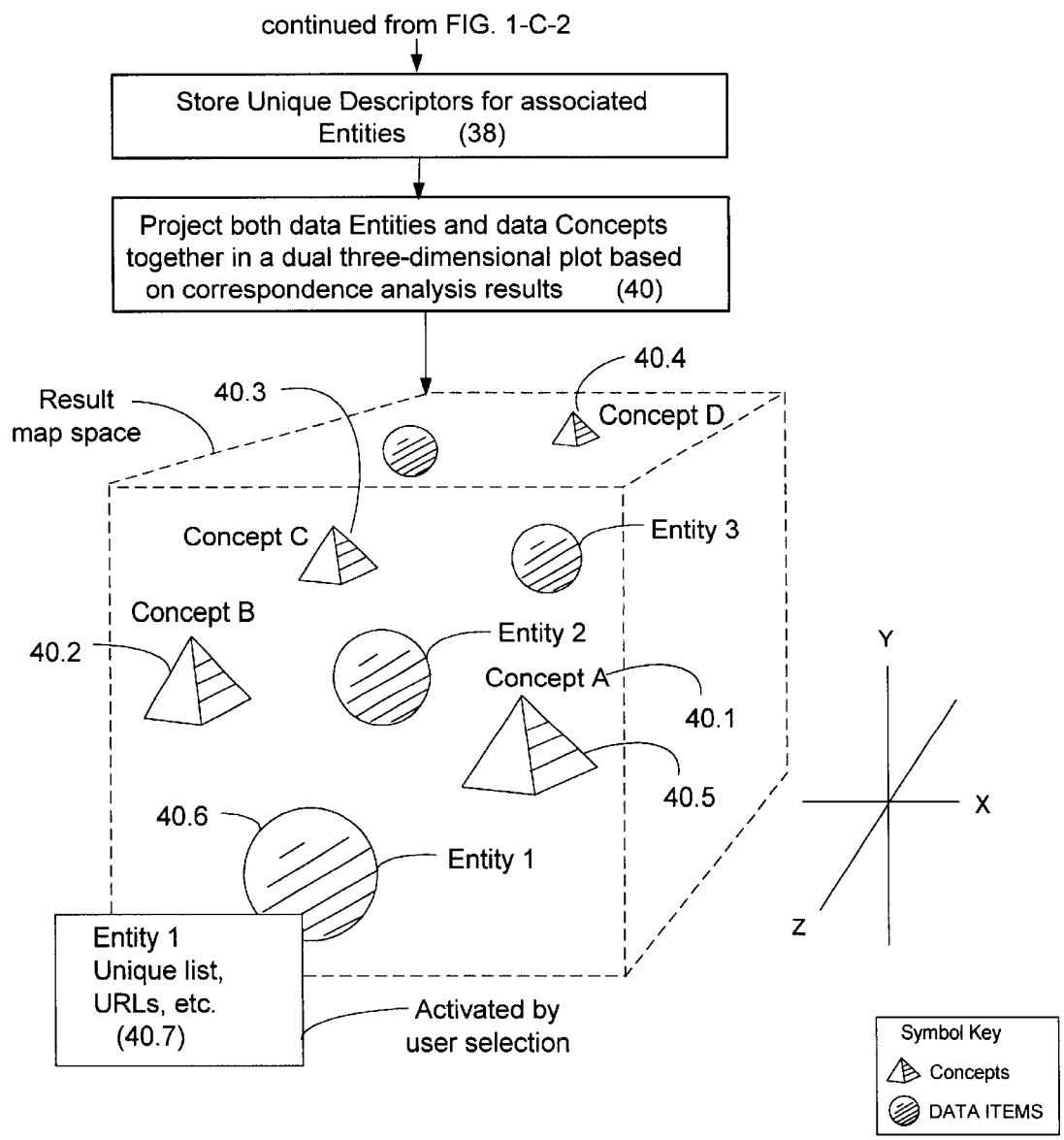
FIG. 1-D

FIG. 7

DISPLAYING IMPLICIT ASSOCIATIONS AMONG ITEMS IN LOOSELY-STRUCTURED DATA SETS

CROSS-REFERENCE TO RELATED APPLICATIONS

This application claims the benefit of U.S. Provisional Application No. 60/131,411, filed Apr. 28, 1999, and U.S. Provisional Application No. 60/149,093, filed Aug. 16, 1999, which applications are incorporated by reference as if fully set forth herein.

STATEMENT REGARDING FEDERALLY SPONSORED RESEARCH OR DEVELOPMENT

Not Applicable

BACKGROUND OF THE INVENTION

This invention relates to the field of computer-implemented systems and methods for extracting and displaying implicit associations among items in loosely-structured data sets.

The advent of electronic data storage and retrieval technology has provided users of that technology with significant benefits in terms of the ability to request and receive enormous amounts of information with very little effort and in a very short period of time. Associated with these advance, however, is the difficulty in identifying information that is relevant to the searcher's notion of what he wants to find, and separating that information from the sheer volume of data retrieved which is not relevant to those concerns. This issue is familiar to anyone who has used one of the common search tools to search the worldwide web for information: potentially thousands of pages of information are returned, but there is almost no assistance in identifying which are relevant to the searcher's interests, and which are not.

People are increasingly surrounded, if not bombarded, with a growing volume of data and information. Gaining access to data is relatively easy; being able to sort through that data to find information relevant to our interests is increasingly difficult. One general approach to this problem has been to attempt to narrow search results by filtering out items deemed irrelevant to the searcher's interests. The purpose of data set search mechanism, such as Standardized Query Language (SQL) inquiries for formally structured databases, or search "engines" such as those used by popular Internet sites, is to return a subset of the total data set based on the specifications supplied by the person making the query. The usefulness of these search mechanisms, depends to a large extend on the knowledge and sophistication of the person making the query: if the query is formed using the same terminology used to describe or index the data source (of course this is required in the SQL query example), the greater is the probability that the query will return "relevant" information. The less the searcher knows about the structure or specific terminology describing the data set being queried, the greater the volume of irrelevant information that will be retrieved.

However, the capability of judging what the searcher's actual intentions and interests are, in the context of an automated search system such as a computer search algorithm, is highly problematic. This is especially difficult when the searcher's intentions are vague or uncertain, which leads to search criteria that are ill-defined and ambiguous. This is a well-known and unsolved problem in the field of data search and retrieval. Natural languages, such as English, are comprised of numerous words and expressions capable of conveying multiple meanings, the intended meaning of which is often recognizable only when the ambiguous term is considered in context with other surrounding terms and conceptual constructs. To compound the problem, the searcher may not realize what he is looking for, and may recognize relevant data only when he sees it in a context that he could not have specified in advance. One common strategy in defining the context that will lead to relevant information, is to interpret the searcher's intentions by filtering out assumed irrelevant data based on that interpretation. However, solutions based on such interpretations of the searcher's intent may fall short of delivering relevant data, especially when the query itself is uncertain and not fully defined.

The identification of items in a data set can be facilitated by imposing a categorical structure on that data, which is another general strategy that has been applied to the problem of producing relevant search results. A number of Internet search engines use this approach, grouping results in terms of such categories as "music," "travel," "shopping," and so on. This approach, although arguably more useful than most attempts to discern the searcher's underlying intentions, has numerous problems. Sorting data items into determined and fixed categories generally requires human intervention and interpretation; that is, the process is expensive and not easily automated. Also, data items frequently fall into multiple categories: how are they to be represented? There can be many alternate interpretations of what belongs in one category and what does not, and this added to the ambiguity of language itself means that imposing an external categorical structure on a complex data set is difficult, costly, inexact, and generally incomplete. Last and not least, the relationships between the categories themselves cannot be easily conveyed to the searcher. There is a relationship between, for example, all "countries" and all "vegetation," but this type of relationship cannot be described in a fixed category, "list-like" format typical of popular Internet search engines.

Consider a simple example: a person is visiting a city which he has not visited in many years. The person has a vague memory of a wonderful restaurant where he dined with friends long ago: he has no idea where it is, what the name might be, but he does recall that it had an ornately carved wooden bar made of South American rosewood, and that the cuisine was an interesting combination of Italian and Asian, although he cannot remember if it was Thai or Vietnamese, or possible Chinese. To find it again, he might look in the hardcopy telephone Yellow Pages, or access an electronic yellow pages.

Use of the hardcopy Yellow Pages requires that the person run down the entire alphabetical list of restaurant names, hoping to remember the name itself, or he may be able to browse through a categorical listing of "Italian" as opposed to "Chinese" restaurants. His chance of finding the information he wants, namely the name of the restaurant, depends on his ability to "recognize" that name when he sees it.

Online, using a Web-based yellow pages, he can specify a Boolean search, using terms such as "Italian AND Asian," which may return a large list of restaurants, from midtown to the farthest suburban outpost, and offering many combinations of cuisine. The restaurant he is looking for may be in this list somewhere, but again, not obviously so. The only hope he has of finding it is to painstakingly work down the list, and perhaps go to individual restaurant Web sites, reading the descriptions and looking at the pictures. Still, even though he is not exactly sure of what he is looking for, if he located a reference to an Italian-Asian cuisine restaurant which mentioned an ornately carved antique rosewood bar, he would feel relatively confident about having found what he was looking for.

What would be preferred in this situation is a more detailed category, and at the same time a more semantically flexible category, to describe something close to what he is looking for: Italian-Asian-possibly-Vietnamese restaurants with antique carved-Rosewood-bars. Attempting to express this type of dynamic, subjectively-relevant categorization, through the use of fixed, hierarchical category schemes is problematic at best, and virtually impossible in terms of anticipating all the combinations of categorical constructs possible. An ideal solution to the problem would be a query result, based not on externally defined categories, or on categories which may be specified in the search itself, but a query result based on the categories inherent (implicit) in the data set, and based on the content and descriptions of the individual data items, no matter what that content might be.

To stretch the above example, suppose the restaurant the person is looking for is actually run by a Greek-Cambodian couple, and thus the cuisine is off the mark of his original search criteria And, that he had forgotten that it is furnished with chairs from the Captain's table of an old whaling ship. He did not specify this in his search, but if he sees "ship" or "Captain's table" as an inherent categorical element in one of the returned data items, his memory might be jogged into recognizing that this is the restaurant he is looking for.

Actual success in finding what one is looking for may depend on seeing a broader set of associations within the targeted data set. The way people recognize and understand something is largely based on its context, and on the relationship and proximity to other things they perceive as being associated with it. The silhouette of a crowd in a photograph, for example, might be a crowd of people anywhere; however, if the view includes an outline of the Eiffel Tower in the background, one is instantly oriented to the context of the scene, including all the connotative implications of such a scene based on the viewer's knowledge and presumptions about it.

The sense of context one gets from comparing and contrasting the items in a data set to each other facilitates one's recognition and understanding of those data items. Without the ability to discern relational context within a data set, it is difficult for a searcher to focus on those specific areas of the entire data set which are most closely related to his or her subjective intentions. It is also difficult for the searcher to get a sense of the semantic breadth of the data set as represented by its most divergent items. The strength of the relationships or associations among items in a group provides a context which facilitates one's cognitive recognition of those data items themselves. In this sense, the capability of presenting a data set in a comprehensive relational context, independent of the searcher's search criteria, where the searcher can perceive associations between data items and between groups of data items, facilitates the ability to recognize those data items and relationships that are subjectively relevant. Existing Web search engines and methods convey this type of relational information very poorly, if at all.

One very general approach that has been applied toward representing context or relevance in data sets has been to collect a measure of similarity among all data items and then to use those measurements to calculate Euclidean "distances" between all objects which correspond to the perceived similarities between the data items. Although a number of mathematical techniques can be used to produce a schema in which associations between data items are represented as distances in an n-dimensional space, all such methods have as their basis the linear- or matrix-algebra decomposition of an input matrix consisting of data items, each of which has a value indicating the strength of its association to other data items according to some set of measuring criteria. As noted in the review below of methods in related art references which use Euclidean distances to represent associations in data sets, most are concerned with focused search and retrieval methods that have serious limitations in terms of portraying relational context in the data set. Given a profile, or set of values of the same type as the original measurements which produced the Euclidean distances between data items, a very specific set of data items can be identified and retrieved from the total data set. Such techniques can offer the possibility of retrieving data items which are "close to" the searcher's target data items in terms of Euclidean distance, though such items may not be exact matches. The methods in the reviewed references, however, suffer from limitations in that they require additional input from the searcher in terms of creating a "search profile," or they require a "training set" of documents or text passages similar to the items being searched for. Each of these methods still attempts to filter or reduce the data set by eliminating items deemed to be irrelevant to the search, and therefore provides an overly restrictive sampling of the data in terms of context. The criteria used to create the measurements of similarity in these examples are not relevant to the conceptual content and meaning of the data set. For example, the similarity of two or more documents may be compared based on measurements of how frequently the words in those documents are used in the English language. This produces a uniform measure which can be used to indicate some kind of similarity or dissimilarity among the documents, but it tells one nothing about the conceptual structure of the data set as determined by the contents of documents themselves. In addition, these methods require extensive pre-indexing or pre-processing of the target data set, in that similarity measures must be calculated among all items in the target set, not just the subset of interest to the searcher, prior to the search. Although such indexing could be done once for an entire data set, there is a high processing cost associated with this kind of pre-indexing. More realistically, because data sets in the real world are dynamically growing and changing on a continual basis, re-indexing of the data set is a continual requirement which carries a high overhead cost. Thus, the methods reviewed below offer no provision for representing the kind of information for which there is a recognized need: that is, for providing a contextual overview of the unstructured, frequently-changing data set or subset, in which the strengths of associations among the data items are apparent, in which those associations are based on the actual conceptual nature of the data items themselves, and in which the concepts which create the associational structure are visible and apparent to the searcher.

One way to convey such conceptual-associational-relational information in a data set, or part of a data set, is to show it, that is, to present the data items in a visual plot or graph such that the distance between data points represents some measure of strength of association between those data points. The Euclidean distance approach toward data set representation allows this type of visual presentation. The result is a plot or graph in which like items will cluster visually with other like items, and further away from dissimilar items, and the groups or clusters of items which are thus formed will also do the same: groups of similar items tend to cluster together and clusters of dissimilar items tend to lie at opposite ends of the plot. This can facilitate the viewer's perception of overall patterns and structure in the data space. In addition, the ability to convey strength-of-association information about a data set helps to disambiguate the searcher's intentions, particularly when those intentions are vaguely formulated or when the terminology used to frame the intentions are ambiguous. Suppose, for example, the searcher is looking in the data set for instances of the word "plant." Is that "plant" as in "vegetation", or "plant" as in "to sow", or "plant" as in "manufacturing plant?" In fact, instances of all three uses of the word could be in the data set. If one could view a visual map of the relationships in the set, or part of the set, one might be able to recognize familiar items which would give one clues as to which instance of "plant" one is really interested. For example, a datum instance labeled "plant" in close proximity to one labeled "building", and a datum instance labeled "plant" in close proximity to one labeled "tree" or "root" or "farmer", gives one cognitive clues about the actual meaning of each instance of the ambiguous label "plant". The ability to view the data set all at once, and to see associations between items based on the visual phenomena of clustering and distance, allows the viewer to form cognitive categories which are subjectively relevant, and to help to organize and lend familiarity and structure to the data set as a whole. It can be argued that the observer himself or herself best determines what is subjectively relevant, and the capability of presenting the data set in a comprehensive relational context, where the observer can see associations between data items and between groups of data items, facilitates the observer's ability to recognize in the data set that which is subjectively relevant and that which is not.

Some of the methods in the references reviewed below are somewhat related to this general issue in that they take the approach of plotting similarities between data items as distances in Euclidean space. Each of these methods is limited by exhibiting one or more of the undesirable characteristics previously discussed, for example, by requiring pre-indexing of the target data set, or by requiring a search profile, or by requiring extensive input on the part of the searcher. In addition, each lacks one or more of the following desirable characteristics: (1) the ability to automatically categorize the data based on the conceptual content of the items in the data set, in other words, to let the data categorize themselves (2) the use of similarity measures which reflect the nature and content of the data set itself, and (3) the ability to display the full range of relationships in the data set, that is, to display not only individual data items in the visual plot, but also to display the underlying concepts which bind various members of the data set together, and, in addition, to display the strength of relationships between those concepts in the whole data space.

A variety of solutions to the problem of information overload have been proposed in the related art. The limitations of background art in the patent literature and in the non-patent literature are described below. The U.S. patents identified by number below are incorporated in this disclosure by reference as if they were set out in full herein.

Deerwester et al. (U.S. Pat. No. 4,839,853) and Deewester et al. (U.S. Pat. No. 5,778,363) disclose methodologies for revealing information structures in collections of data items, and identifying structure, such as associative structure, in such a set. Part of the described methodologies involves cross correlation of two or more sets of data and the calculation of distance and similarity measures using, in part, singular value decomposition. Thus, these search retrieval methodologies are limited in that they require some type of pre-indexing of the data set. The user of the methodologies must construct a query vector consisting of pairs of attribute identifiers and scalar values. The attribute identifiers must be from the same set of terms used to pre-index the target data set. Given a query vector consisting of attribute items, the methods return related data items; conversely, given a query vector consisting of data items, the methods return related attribute items. The methods are limited in that they are incapable of accomplishing both tasks simultaneously. In addition, these references disclose search and retrieval methodologies, not methodologies whose object is to represent associations between objects in a data set and their inherent conceptual descriptions. Moreover, there is no provision for plotting the data set or for revealing relationships in the data set other than those between the query profile and the subset of returned results.

Gallant (U.S. Pat. No. 5,325,298) discloses a method for generating context vectors for a plurality of word stems to be used in a search and retrieval system. Context vectors are based on the relationship of a given word to a fixed set of other words. A summary vector for a document is created based on the context vectors of all non-noise words in the document. Searching for relevant documents is accomplished by converting a user inquiry into a query vector which is compared to the summary vectors of a set of documents. The method is limited in that it requires extensive preprocessing of the target data set and preprocessing of a user query. Measures of relationships between documents are indirectly based on the relationships of individual words in the documents to an arbitrarily chosen set of criterion words.

Hutson (U.S. Pat. No. 5,559,940) and Hutson (U.S. Pat. No. 5,761,685) disclose a multi-dimensional text search, retrieval, and display system. Textual data is converted into a two-dimensional matrix and analyzed by means of a single value decomposition (SVD) technique to decompose the matrix into its lexical, semantic and/or textual structures. Extensive pre-processing of the target data set is required. Similarity measures are based on the translation of sentences into standard syntactic structure with a subsequent rating. A query profile is required of the user of the methodology; the results are a filtered subset of data items deemed relevant to the user's subjective intentions. The results are represented in a three-dimensional cube, similar to a stack of documents. An historical database of associations is required for the optimal functioning of the method.

Caid et al. (U.S. Pat. No. 5,619,709) and Caid et al. (U.S. Pat. No. 5,794,178) disclose a system and method for generating context vectors for use in storage and retrieval of documents and in visualizing of information using graphical representations of context vector based relationships. The context vector generation scheme is limited in that it relies on a processing-intensive neural network operating on a training corpus of records. The resulting vectors are relationship based, formed by the proximity of words to one another. A learning law is used, employing a technique of "windowed co-occurrence" wherein a fixed-size moving window is applied throughout the document, and words within the window may exert "influence" on neighboring words in accordance with pre-determined measures of mutual co-importance. The results of the method can be displayed in a simulated three-dimensional space, but the method is limited in that data items cluster in proximity to axes projected through the space. The axes represent the query terms of the user of the method. The method is further limited in that no attempt is made at further categorization of the returned set of data items, nor are other conceptual relationships between the data items revealed or represented, other than that they are all related to the user's query terms in some way.

Egger et al. (U.S. Pat. No. 5,832,494) disclose a computer-implemented research tool for indexing, searching and displaying data. Text objects are indexed by creating a numerical representation of the data using an indexing technique called "proximity indexing." The technique is used to find the relations, patterns and similarity among the data using statistical techniques and empirically-generated algorithms. This invention is limited to analyzing the relevance of text objects to a selected object and cannot be used to analyze the associations among all objects in a database. In one embodiment of the invention, "case law" text objects are analyzed for the presence of one or more of eighteen specific patterns (e.g., "B cites A") that are alleged to "capture most of the useful information in a cross-referenced database"). A "coefficient of similarity" is calculated by a "similarity routine" that operates on a "proximity matrix that contains "column vectors" that represent the relationship between a selected case and every other case in the database. One step in the calculation involves determining the absolute Euclidean distance between a selected column and the other columns in the matrix. In another embodiment, a "Semantical Clustering of a Boolean Index Routine" is used to index text objects according to the similarity of phrases and words contained within each text object in the database. Clustering algorithms from Hartigan, J. A. *Clustering Algorithms*, New York: John Wiley & Sons, Inc., 1975 are used which differ from the dual-scaling algorithms used to implement the present invention. In yet another embodiment, case law textual objects are organized in a "conceptual space" in which "degree of similarity" is represented on a vertical ("Y") axis and publication date is represented on a horizontal axis ("X"). The degree of similarity is a measure of the topical relatedness of text objects from a pool of such objects to one or more selected text objects (e.g., a particular court decision or web page). In a preferred embodiment, the "depth" of the object in the "Z" dimension is used to convey additional information to the user (e.g., "whether or not there is available (hidden) data associated with" the object). The method is limited in that data presentation is "three dimensional" only in the sense that it consists of three superimposed hierarchical flow charts.

Pirolli et al. (U.S. Pat. No. 5,835,905) and Pirolli et al. (U.S. Pat. No. 5,895,470) disclose a system for extracting and analyzing information from a collection of linked documents at a locality to enable categorization of documents and prediction of the relevance of documents to a focus document. This invention is limited to analyzing the relevance of linked entities (e.g., linked Web pages at a particular Web locality or site) to one or more selected entities and cannot be used to analyze the associations among unlinked documents. The invention requires that the raw data characterizing documents be extracted from the documents, including (1) topology ("logical organization . . . as defined by links") of documents at the locality, (2) usage flow and (3) interdocument similarity. In a preferred embodiment of the invention, documents in a locality are processed by a statistical content analysis (SCA) process to yield token ("word") statistics (e.g., word occurrence). A document vector is produced for each document, in which each element of the vector represents the presence or frequency of occurrence of a word in the document. For each pair of documents, a dot product of the document vectors is computed to produce the interdocument similarity measure. The invention calls for the documents to be categorized, preferably by function, into categories that the invention assumes are defined by a person. A technique called "spreading activation" is used to predict the relevance of any particular document at the locality to one or more focus point documents. The focus point documents may be specific document(s) or a prototype of a category. The system may be used to provide input to visualizations that are based on one or a few characteristics of the documents. The method is limited in that it does not provide an overall view of the conceptually-determined associative structure of the data set. It is also limited in that basing relevance criteria on past usage patterns discourages serendipitous discovery and conceptual browsing of a data set. Methods intrinsically different from the dual-scaling methods used by the present invention are used to produce the representation of associations in the data set.

Wolff (U.S. Pat. No. 5,847,708) discloses a sorting technique in which a computer interacts with a user to develop a spatial structure to represent information. Extensive pre-indexing of the target data set is required. Extensive interaction with the user of the method is required to produce a sorted, organized computer screen display of data items which meet the user's criteria Similarity and distance metrics are computed among items in the target data set, based on a fixed set of feature metrics or characteristics, and the data set is presented to the user in this way. The user can then change the distance relationships among the displayed items to represent clusters of items that appear relevant to his or her needs. The method then queries the data set for a new set of data items based on the distance relationships specified by the user. The criteria used to judge similarity among data items is externally imposed, for example, dates of publication, rather than emanating from the conceptual nature of the data items themselves. A general limitation of most associative distance plots, such as the one produced by this method, is that the basis of the similarity measure or measures is implicit and implied, but not explicitly stated or revealed. The user of this method may be basing similarity judgments on a set of criteria which is quite different from the criteria for similarity imposed by the method itself Rao et al. (U.S. Pat. No. 5,883,635) disclose a computer-implemented method of producing a single-image compressed view of a multi-image table by replacing the character image information in each cell of the multi-image table with a graphical representation of the information. The method is limited in that it cannot be used to illustrate associations among textual documents. The method provides a sequential, tabular view of multiple attribute measurements ("average", "career average", "salary"), which have been translated into various standard visual representations appropriate to the data: bar graph, frequency graph, scatter plot, etc., all of which differ from the approach, object and form of the present invention.

Johnson et al. (U.S. Pat. No. 5,917,500) disclose an intellectual structure for displaying multi-dimensional data by representing it as a computer-generated model or plot of data in a parallel or non-orthogonal coordinate space. The data display facilitates relative motion of an observer with respect to the data. The invention cannot be used to display associations among documents in orthogonal Euclidian space. The method as described applies to the representation of continuous data in visual slices within a three-dimensional space, as opposed to the representation of discrete, categorized data in which the relationships between data items and category items are revealed, as is the case for the present invention.

Punch, III et al. (U.S. Pat. No. 5,924,105) disclose a method and product for generating a word set for use in locating documents having a type similar to a type of document in a document collection. The method involves selecting group of documents (i.e., grouping the documents into labeled categories), stemming the words in the documents to obtain stem words, determining a word count for each stem word in each document, clustering the stem words base on the word count of each stem word to obtain a word set. The invention is limited in that the selecting and category labeling step is performed by a user based on his/her individual preferences. The stemming step is accomplished by means of standard information retrieval techniques. A pattern matrix is developed with rows representing documents and columns representing individual features (word stems) and the feature values being the number of occurrences of the given word in the given document. In one embodiment, conventional feature selection methods, such as sequential forward selection, sequential floating feature selection and genetic algorithm searching may be used to improve the accuracy of the process of clustering features into groups with similar members. In a preferred embodiment, Hartigan's K-means partitional clustering algorithm is used to look for similarities among column (word stem) vectors. The K-means algorithm is run several times with different random seeds in order to improve the performance of the method (i.e., increase confidence in the resulting clusters.) The resulting word set may be used to construct search engine queries. The K-means algorithm differs from the correspondence algorithms used in implementing the present invention.

Hilsenrath et al. (U.S. Pat. No. 5,926,812) disclose a computer-implemented method for comparing the contents of two sets of documents. The invention cannot be used to establish the associations among all documents in a collection. Corresponding sets of "document extract entries" are extracted from each document set. Each extract entry comprises a weighted word histogram, i.e., a set of histogram word records. Each set comprises a word from the document, a word score (i.e., a measure of the importance of the word in the document), the number of appearances of the word in the document and a list of position indices for the word. Corresponding sets of word clusters are generated from the sets of document extract entries. Each word cluster comprises a cluster word list having N words, an N×N total distance matrix and an N×N number of connections matrix. Similar word clusters are grouped and combined to form a single word cluster for the group, but concepts are not extracted. The degree of similarity between clusters is determined by summing diagonal matrix elements, summing off-diagonal matrix elements and by summing all matrix elements. The method uses certain known characteristics of the sub-matrix partitioning of matrices which allow the data represented by those matrices to be sorted into subsets. Certain measures of the differences between those subsets are taken and used as a kind of metric profile which allows the retrieval of documents more or less matching the same profile. Therefore, it is a search and retrieval methodology, as opposed to one which reveals the conceptual context of the data set. The object of the methodology is to return data relevant to the user, not to facilitate the understanding conceptual relationships within the data set.

Non-patent sources of information known to be relevant to the present invention include several academic papers regarding the application of dual-scaling methods, primarily correspondence analysis, to market research. The origins of correspondence analysis, which is a geometric approach to multivariate descriptive analysis, go back to at least the 1930s, and it has been known by various names including dual scaling, reciprocal averaging, homogeneity analysis, and canonical scoring. The basic methodology is typically used for qualitative exploratory data analysis. In the United States, researchers and statisticians such as Hoffman and Franke (1986) and Carroll, et al. (1986, 1987) published discussions of the mathematics involved in correspondence analysis in the context of its application to market research. The basic techniques have also been applied to research in the social sciences. The following is a list of academic background sources for mathematical algorithms used as part of the methodology of the present invention:

Hoffman, D. L. and Franke, G. R. (1986) in Correspondence Analysis: Graphical Representation of Categorical Data in Marketing Research, *Journal of Marketing Research*, 23, pp. 213–227, describe how to apply correspondence analysis to categorical data obtained in marketing research.

Carroll, J. D., Green, P. E. and Schaffer, C. M. (1986) in Interpoint Distance Comparisons in Correspondence Analysis, *Journal of Marketing Research*, 23, pp.271–280, describes the conditions under which squared interpoint distances (particularly between-set differences) can be compared in correspondence analysis of marketing research data.

Carroll, J. D., Green, P. E. and Schaffer, C. M. (1987) in Comparing Interpoint Distances in Correspondence Analysis: A Clarification, *Journal of Marketing Research*, 24, pp.445–450, describe conceptual and empirical differences among scaling options in correspondence analysis.

Hoffman, D. L., de Leeuw, J. and Arjunji, R. V. (1994) in Multiple Correspondence Analysis in R. Bagozzi (Ed.), *Advanced Methods of Marketing Research*, pp. 260–294, Malden, Massachusetts: Blackwell Publishers Inc. describe using multiple correspondence analysis techniques to illustrate similarities and dissimilarities among brands with respect to variables describing the brands.

The discussions and examples used in each of the papers referenced above are based on survey or other data collection documents which must be manually completed by a group of subjects. Such data collection instruments typically consist of a table in which the pre-defined data items of interest, for example, companies or brand names, are listed in the column positions, and a pre-defined set of attributes or categories, for example, "reliability", "customer response", "manufacturing", etc., are listed in the row positions. Subjects are instructed to indicate in the table, using a pre-defined scale, how they rate each of the data items in regard to each of the attributes. A summation table of all subjects responses is used for input to a dual-scaling operation. It is apparent that each of the papers referenced above is limited in that it assumes a set of pre-defined attributes or categories by which subjects can rate each data item, and each relies on a human subject or subjects to perform the rating. Unlike the present invention, none of the above references are concerned with exploring inherent and self-described conceptual relationships among items in a data set, and none provide or suggest a method by which such an exploration could be accomplished in an automated fashion using dual-scaling algorithms.

Other known non-patent and non-academic sources with some relevance to the present invention include the following:

Rao, R. and Sprague, Jr., R. H. (1998) in Natural Technologies for Knowledge Work: Information Visualization and Knowledge Extraction in Journal of Knowledge Management, 2(2), pp. 1–14. This article is a survey describing various recent information visualization techniques, such as the Perspective Wall, the Cone Tree and the Hyperbolic Tree. The article also includes discussions of a variety of linguistic processing functions, such as tokenizing, stemming, tagging and phase extraction. The reference is limited in that none of the described visualization techniques, which include hierarchical display structures, nodal display structures, a three-dimensional "perspective wall" with item types displayed on the wall, and "small-multiples" types of tabular displays, resemble or offer the advantages of those of the proposed invention in terms of visual structure or in terms of objectives.

In regard to the discussed linguistic processing techniques, two of them, elimination of "noise" words, and "stemming", are relevant to the present invention. Noise words are simply words which are to be disregarded in a content or structure analysis. No related art reference, however, eliminates from consideration as "Concepts" (as that term is used in the present invention) of noise words consisting of articles of speech, forms of the verb "to be", all words less than three characters in length, and so on. Moreover, in none of the above references, is a method disclosed in which users are able to further define the set of noise words to include various parts of speech, such as all adverbs, as well as specific words or terms to be ignored in the analysis, the latter including even Concept terms, as is the case in preferred embodiments of the subject invention.

The present invention also makes use of a technique somewhat analogous to stemming, but stemming is quite different in concept and, in terms of the present invention, quite different and limited in effect. In the related art, "stemming" is the reduction of various grammatical forms of a word to some common form through the use of an algorithm which modifies or removes the word endings. The resulting common form is not necessarily correctly spelled: for example, the typical stemming algorithm reduces "computer", "computers", "computing", and "computation" to the common form "comput". Common methods of stemming available in the related art are limited in that they are not particularly useful for identifying root Concepts, which is an object of the present invention, or for displaying them in a visual plot since the common stem word is frequently misspelled. In no combination of related art references are various grammatical forms of words in Entity descriptions reduced to grammatically correct words representing the root concepts on which those word forms are based, as is the case with the present invention. Typically, in the present invention, this is the noun form of a given word: "computing" and. "compute", for example, become "computation", while "computers" and "computer" become "computer". Such translations are made prior to the step of identifying Concepts. In this manner, the strengths of associations between Entities are based on fundamental and underlying conceptual similarities between them, which is not the case with related art methods.

In a February, 1999, article by George Lawton, (Lawton, G. (1999) in Building the New Knowledge Interface, Knowledge Management), the author writes of a conversation with Jim Blair, a research director with the Gartner group, in which Blair envisions in the future a three-dimensional environment (a "star map") displaying information which might resemble galaxies, solar systems, planets, and moons. When a user searches for information, he gets back not a list of items, but a planetarium view which shows the relationships between the various documents. Those skilled in the art of clustering techniques used in market research and in the social sciences note the visual analogy between "cluster maps" and "star maps." The purpose of cluster maps, as discussed throughout this document, is to reveal relationships between objects in the visual plot: the techniques for doing so are well known and are not new. Related art references are limited in that in no instance are the measures of similarity, or Concepts, extracted from the data set itself. Furthermore, no references disclose an effective methodology for using Concepts to measure the strength of association and relationship between data Entities, and effective methodology for displaying Concepts in relationship to the data Entities. Thus, no discussion or speculation in the Lawton (1999) article suggests the methods or the results of the present invention. Furthermore, the first experimental prototype reducing the present invention to practice was built and operational before the Lawton (1999) article appeared in print.

In all likelihood, the use of three-dimensional computer simulation, as well as in the notion of displaying information within such a space and being able to navigate through it, will continue to increase in popularity. There are a multiplicity of ways to combine these two factors, but the methods for doing so can differ widely in terms of purpose and in terms of the nature and usefulness of the information they convey. For example, the following quote was taken from the San Francisco Chronicle business section, Feb. 18, 1999, in a story concerning the rollout of a new three-dimensional chip made by Intel:

"The Pentium III represents a great leap forward in using three-dimensional technology.

Intel demonstrated some examples, including a search on the Excite Internet directory that served up results looking like satellites orbiting small planets."

A phone call to the reporter and a check with a spokesperson at Excite, Inc., revealed the demo was a soon-to-be-released product named Excite Extreme. The "planets" around which "satellites" orbit are standard high-level Excite search categories such as "Sports", "Weather", "Business", etc. The satellites are Web sites returned by a user's query, and they orbit in an animated fashion around their respective categories. The methodology disclosed in this reference is limited in that the data set is made to fit a predetermined set of categories, with the categories being placed in predetermined locations in the attribute space, rather than allowing the data set to determine the shape of its own space based on its inherent conceptual characteristics. Even if the display were based on a variation of the dual-scaling methods previously discussed (which is not suggested by the related art), the somewhat gratuitous orbiting of data objects around category objects would serve only to eliminate the possibility of perceiving distance-based relationships among objects in different categories. Such a presentation is limited in that it does not address the common situation in which objects belong to multiple categories, including the common situation in which an object belongs very much to one category but not so much to another. The disclosed presentation method is further limited in that it does not convey information about the relationship of the categories to each other, e.g., "What is the relationship of "Sports" to "Weather" or "Business" in the context of the current data set?" Thus, the methods used by Excite Extreme for formulating the attribute categories ("planets") as well as for displaying the associative relationships between attributes and data items in a three-dimensional space are, thus, substantially different from and limited in comparison to those described in the present invention.

The Pacific Northwest National Laboratory (PNNL) has posted information about a variety of its proprietary information visualization technologies on a website entitled, "SPIR—Spatial Paradigm for Information Retrieval and Exploration." SPIR was apparently developed in secret for the U.S. intelligence community. Aspects of the SPIR technology have been commercialized by Cartia, Inc. and maps produced using the technology are illustrated on its websites at the domains cartia.com and newsmaps.com. These references are limited because the process used to produce the maps is not disclosed and cannot be determined by examining the maps. Koprowski, G. in New Markets Plugged In, Nov. 9, 1995, reported that one of the SPIR visualization engines, named Galaxies, uses "principal components analysis algorithms" to "identity potential axes with the highest information content," but how this is done is not disclosed. Thus, the discussion of these references presented herein is a conjecture.

SPIR-related technologies are limited in that they appear to rely, in an initial text processing step, on an analysis of the context of terms in documents to ascertain their meaning and on a measurement of the frequency of occurrence of terms in different documents to give weight to a similarity measure. The approach of analyzing and weighting the probable meaning of ambiguous words in documents is costly in terms of processing, error prone, and not necessary to produce a meaningful relational map of an information space. It is much more efficient to use the relationships between all root terms and entities in a data set to differentiate the intended meaning of ambiguous terms.

It appears that SPIR-related methods rely on methodologies that require input of an N×N matrix of data items by data items, as opposed to a smaller and more efficient N×M matrix of data items by categories. This is a serious limitation because the statistical algorithm is required to process a much larger volume of data. N×N matrices expand very quickly, as $(N*N)+N/2$ entries are needed to produce a contingency matrix for the data items. These methods are also limited because the "themes" used to generate the values in each element of the matrix are represented implicitly and indirectly by the vectors formed by dense groupings of data items in the space, possibly by means of a principal components analysis.

Some SPIR-related technologies use an essentially two-dimensional "topographic map" display in which peaks are rendered to appear to be higher than valleys, with peaks representing concentrations of documents with similar "themes." This approach is limited in that it does not make use of the third dimension, i.e., the z-axis, to provide an efficient context in which to differentiate relationships of objects in the space. It may be that a form of cluster analysis is used to produce the groupings, which are rendered as irregular shaded areas on the topographic map and that the groups are labeled using an undisclosed method of extracting themes from text. The technology is limited in that it handles the problem of themes that span more than one data item group by repeating the label of the theme in each data group with which it is associated. This approach is less effective than representing each concept object as a single point, more or less equidistant from all the data objects it is related to, unless some other strong relationship(s) skew the data objects in a particular direction. In fact, maps produced with SPIR-related technologies appear to have no individual points which represent concepts. Thus, these methods do not plot Euclidean distances between concepts in three dimensions, which has great value in the present invention, and, hence, appear to use a basically different and less effective approach to displaying information about items in data sets.

The foregoing review of related art shows that many problems in the area of information overload have not been solved by developments in the related art. In summary, the limitations, deficiencies and disadvantages of related art methods for representing conceptual and relational structure in data sets are as follows:

Most of the references require pre-processing of the targeted data sets, which is required to produce a referent structure that can then be searched for relevant information. Such pre-processing relies on a set of predetermined categories or characteristics, such as "restaurants," or a predetermined metric, which is used to organize the data. Various sophisticated pre-processing statistical techniques are employed by the referenced examples, but any methodological requirement that the target data set be pre-indexed or pre-processed is problematic in terms of processing overhead involved and in terms of maintenance of the target data set as it grows and changes.

Most of the referenced methods focus on matching the pre-processed data set structures to search queries, or criteria, or "profiles", supplied by the user. Data are then located in the pre-processed data set which matches the search criteria. This approach is counterproductive in certain situations in which the search criteria are not exact. For example, if one remembers a restaurant as being Italian when, if fact, it is Greek. In this instance, one would prefer the candidate data set to include items which are in some way associated to the query terms, though the match may be inexact. It will be noted that some of the referenced search and retrieval methods do return a kind of "fuzzy" data subset, but, again, these similarity relationships are based on eternally-imposed criteria or metrics rather than on concepts inherent in the data itself What is preferred is a means of displaying conceptual relationships within targeted data sets based on the associated concepts and instances within those same data sets. This is not accomplished by related art methodologies.

An advantage of using clustering techniques to view data sets is that such techniques reveal groups of similar items. Like categorization, the grouping of items facilitates understanding of the meaning of those items within the data set. As previously discussed, formulating meaningful category labels for groups of data items is a laborious and error-prone process usually requiring human interpretation and/or human intervention. Human interpretation without human intervention, for example, in an automated context, invites incompleteness and error. Human intervention is generally unsupportable in real-time situations, and is very processing expensive in situations in which the data set is amorphous, growing, and changing, for example, the World Wide Web. Therefore, it is not surprising that none of the methods in the related art references attempt to extract or identify categories, and display them as such, in real time. What is needed, ideally, is a method which allows the items in the target data set, whatever that is, to categorize themselves based on their content. In other words, what is needed is a means of allowing the words within the data set to self-describe their context and their interrelated associations.

A similarity matrix is used as input to most clustering techniques. This can be envisioned as a table in which data items are represented in the table's columns and some attribute or attributes on which the data items will be rated are represented in the rows of the table. In the intersecting element of each column and row is a value rating the data item in that column according to the attribute in that row. The attributes can be almost any type of measurements, but attributes that make intuitive sense in terms of the data set produce more intuitive graphical plots. The metrics which the related art references use to generate similarity measurements between data items are often abstract, for example, the frequency-of-use in the English language of various data words, or a measure of word-difficulty, or a measure of word proximity to other words in a document. Many combinations of these and attributes have been used to produce measures of association. These measures can be used to produce plots of the data set in which similarly judged items cluster together. Such measures fall short of explaining the associations between data items in terms of the actual conceptual and semantic relationships among them, however. The observer knows that certain items are more related to each other than to other items, but the metric which produced the clustering, word frequency for example, is an abstract and somewhat artificial measure of that similarity, which tells one little about the meaning of the clustered items. What is needed is a method of obtaining measurement attributes that are conceptually related to the data items themselves.

An invention which could extract categorical information on-the-fly from a data set, which could use those categories to form measurements of similarity among the data items, and could then plot those data items in a visual space, would still be deficient if the extracted categories themselves could not be displayed in a way that clearly illustrates their relationships to the data items. The methods of the related art references are not capable of displaying a dual representation of the data items and the concepts which bind them together, or of the relationships between the two sets, with the result that a considerable amount of important information is missing, or must be inferred, from the plot. In one of the related art references, the search criteria which produce a data subset which is displayed in a data plot are represented as axes projected through the data space. However, given that the user already knows what his or her search criteria are, this approach does not add particular value in the sense of being able to understand the implicit conceptual and contextual structure of the data set. In that respect, what is needed is a method in which (a) the measurement attributes used to rate the data items are extracted from the content of the data items themselves, and (b) the measurement attributes are also displayed as individual items in a graph along with the data items in such a way as to provide conceptual and categorical labels for the data items and data item clusters. This type of exploratory context invites and facilitates the exercise of the user's subjective judgment of the potential relevance of items in the data set, and provides the user with the ability to discover new relationships in the data of which he was not previously aware.

Lastly, the graphical display of data and concept relationships in a visual space benefits from current and common computer graphic simulation technologies. For Euclidean distance plots, the benefits of such technology over a static printed image are obvious, not the least of which being that the Euclidean solution space can be represented in three dimensions, and the viewer can navigate through the space at will in any way desired. This is particularly useful for Euclidean plots of the type discussed here, because the viewer can move toward closely joined objects and around occluded objects in the data space to view them from better perspectives. The ability to view relationships in the data set from a multitude of angles and perspectives facilitates more complex understanding of those relationships. A few of the methodologies previously referenced use and make note of the advantages of three-dimensional representation in simulated computer space. None of them, however, employ such an approach to produce the type of visual representation which would solve the problems disclosed here.

A person skilled in the art will note that the referenced related art does not solve these problems, and it will become clear that they do not teach the present invention's system and method for extracting inherent and implicit conceptual relationships and semantic associations existing among items in a data set, or for representing those associations in simulated three-dimensional space. Thus, no combination of related art explicitly or implicitly suggests the elements or steps of the present invention.

SUMMARY

The present invention is a system and method which overcomes the information overload problems identified above. The present invention is concerned with the extraction of implicit conceptual information from items in data sets, the subsequent extraction of conceptually-based associative information among items in data sets, and the subsequent representation of those relationships within a visual space. Terms comprising such associative information need not be, and in the main are not, specified by the human operator of the invention: rather such terms are culled from descriptions of the data items themselves.

Preferred embodiments of the invention rely upon "dual-scaling" algorithms, methods, techniques or approaches whose output comprises a simultaneous (or dual) plot of objects represented in the rows and columns of a frequency or contingency table, displayed as points in a low-dimensional space. A preferred approach to dual scaling is correspondence analysis, which has also been called a geometric approach to multivariate descriptive analysis, canonical analysis of contingency tables, categorical discriminant analysis, homogeneity analysis, quantification of qualitative data, and simultaneous linear regression. Correspondence analysis has advantages in term of simplicity, efficiency, and non-restrictive assumptions regarding data input, but the methods and systems disclosed herein rely on any of a number of methods that result in simultaneous row and column display of contingency table data in a Euclidean space.

Preferred embodiments of the present invention offers the following advantages and advances over other methods referenced in the background art:

The present invention is not computationally complex, therefore its processing overhead is low. Extensive pre-processing or pre-indexing of the target data set is not required. The current invention calculates associations in the data set on-the-fly.

A "user profile", "input profile", "vector profile" or other type of criteria input is not required for the operation of the invention, nor does the invention require a supporting database.

Input data requirements are simple, and the input can come from an almost unending variety of sources. The only data requirements consist of (a) a name of a data item, and (b) any kind of description of that item.

The attribute items used as similarity measures are generated directly from words from the descriptions of the data items themselves, so they are relevant to the data set by definition. No interpretation or translation of word meaning is required.

The present invention reveals hidden and implicit information about the conceptual nature of the data items and about the conceptual structure of the data set itself The strengths of associations between the categories or attribute items used as measures of similarity are also plotted as Euclidean distances in the graph, along with the data items.

The present invention reveals strengths of association between clusters of data objects and clusters of attribute objects, as well as between individual objects. It also reveals overlapping conceptual and categorical regions in the data space.

The present invention provides a whole-field, simultaneous display of the target data set. The three-dimensional graphics and movement simulation provide detailed views of the data space and allow the observer to look around and behind objects that may be occluding other objects in the data space.

A preferred embodiment of the invention accepts raw input data in the format of Entity: Description pairs (name-description pairs or label-description pairs), extracts Concepts (conceptual information or measurements of attributes), which are the term- or word-based associations implicit in each Entity's description, and uses Concept terms to reveal a relational structure (or associative relationships) among data items which is based on the associative strength between Entities in the data set, between Concepts in the data set and between Concepts and Entities in the data set. This associative structure is displayed in terms of a dual-scaled map, that is, a simultaneous display of both Entities and the Concepts which have been used to associate them as points or virtual objects projected into a computer-simulated three-dimensional space. Viewers can access Descriptions for each Entity by activating that Entity in the visual space, e.g., with a mouse click. Entity Descriptions can include text data, hyperlinks and Uniform Resource Locator (URL) links to original data sources represented by the Entities, or any other electronically-presentable type of data associated with the Entity. When the viewer selects a Concept object in the visual space, the corresponding Entity objects associated with that Concept are highlighted. Conversely, selecting an Entity item in the visual space highlights the associated Concepts. The viewer can select relevant Entities to be retained and included in a subsequent raw data input set which can be re-submitted to the methods of the invention. Viewers are able to fine-tune the process in a number of ways. Various encapsulation and summarization methods are available for simplifying very large or dense data displays.

Preferred embodiments of the invention can use an unlimited variety of target data sets which can be manipulated in a variety of ways to provide data input. A target data site might consist of a subset of World Wide Web sites returned by a conventional search engine used to search for a particular term or combination of terms. In this particular case, Entities would consist of the names the returned Web sites and/or their URLs, Descriptions would consist of a composite of KEYWORD, DESCRIPTION, and META fields from the H.IL representations of the Web sites content, and Concepts would be extracted from the Descriptions of those sites.

Target data sets can easily come from conventional database sources, such as the one maintained by the United States Patent Office. In this particular case, a standard search might conducted on the database and a set of patents returned which meet the search criteria. In that particular subset, Entities would be consist of the titles of the patents, or their numbers, or the names of the inventors. Descriptions could be drawn from the summary, abstract, or description sections of the patent application, or a combination of any of these. Concepts would then be extracted from the Descriptions. A working example very similar to this is referenced later in this document.

A myriad of other data sources, such as personnel databases, medical and law databases, specialized databases of all types whether structured or unstructured, can be rather easily tapped for input into the methods of the current invention. Any text source, such as news publications, works of literature, and periodicals, can be used for input to the current invention. Thus, preferred embodiments of the invention are applicable to data sets obtained by querying databases (e.g., relational and object), flat files and text. A working example is disclosed below in which the Business section of the New York Times was used as the target data set.

Preferred embodiments of the invention involve extracting Concepts from Entity descriptions in a variety of ways. One such embodiment identifies linguistic root terms from terms in Entity descriptions and use one or more said root terms as Concepts. In this embodiment, non-noise terms in Descriptions are reduced to their most common root form, and root terms become Concepts if they are associated with two or more Entities. The user of the system can control the Concept extraction process by specifying various characteristics to use in identifying which description terms can be tagged as Concepts. The user can also control the density of Concept extraction from a given data set.

Another embodiment involves using a computer-implemented thesaurus or other word corpus to refine the process of extraction of Concepts by identifying and eliminating synonyms among root terms. Another embodiment involves the selection of Concepts from a standardized vocabulary, such as a vocabulary of medical terms, job descriptions in a personnel database, etc. Various criteria can be used to select root terms to be used as Concepts in the scaling operations inherent in the present invention. No restriction on the methodology used to identify Concepts from Entity descriptions is hereby implied.

Preferred embodiments of the invention involve quantifying the associative structure among Entities and Concepts in a variety of ways. Quantification of associative structure is accomplished by processing matrices, tabulations, contingency, or similarity tables of Entity/Concept data using a dual-scaling algorithm or algorithms which are capable of producing dual-scaled plots in Euclidean space of both the row and column items in such a table or matrix. A list of such dual-scaling algorithms or techniques includes but is not limited to: nonlinear multivariate analysis, correspondence analysis, multiple correspondence analysis, multidimensional scaling, reciprocal averaging, homogeneity analysis, and canonical scoring.

Preferred embodiments of the invention are capable of using, but not limited to, non-symmetrical tabular matrices containing binary data in order to produce the resulting dual-scaled plot of Entity and Concept objects.

Preferred embodiments of the invention allow users to specify the type of dual-scaling algorithm to be used to calculate relative Euclidean distances between pairs of Entity objects and between pairs of Concept objects. The user can also specify row-centroid, column-centroid, or row-column-centroid symmetric approaches to the calculations used to produce the Entity and Concept display.

Preferred embodiments of the invention allow users to specify the granularity of the Concept display: e.g., to specify that the same root term must be found in 25 percent, 50 percent, or 75 percent, and so on, of the Entity descriptions in order to be displayed as a Concept. This is one method for facilitating a generalization and simplification of very dense displays.

Preferred embodiments of the invention allow users to adjust the sizes of the visually plotted Entity and Concept objects relative to their positions. This has the effect of expanding or contracting the relative distances of objects from one another in the visual data space and provides one way to adjust the visual clarity of and generality of dense data sets.

In addition to displaying relative strengths of associations in terms of chi-square or Euclidean distances in the visual space, preferred embodiments of the invention also explicitly display the relationships between Entity and Concept items, in that when users select Concept objects in the visual space their corresponding associated Entity objects are visually highlighted, and/or listed. Likewise, when users select Entity objects in the visual space, the corresponding Concepts objects are highlighted or listed.

Preferred embodiments of the invention utilize grouping techniques including mathematical operations such as, but not limited to, cluster analysis, factor analysis and principal components analysis, for the purpose of generalizing and simplifying the data display produced from the results of the dual-scaling algorithm. Cluster analysis and like techniques are used to group individual objects in a data space into N number of mathematically distinct clusters. Thus, they are used in some of the methods and systems disclosed herein to group similarly positioned objects in Euclidean space and to provide zoom-in, zoom-out kinds of views of whole data space. Other ways to group data objects in the display space are also envisioned, e.g., groups defined by a spreading linkage of shared concepts.

The preferred embodiment of the invention can then visually reduce individual data items within such a cluster to one encapsulated object or icon representing all the individual data points within that cluster. A combined list of Concepts within such a cluster provides an auto-categorization for the encapsulated object. The reduced representation of the data cluster can also be unfolded into its individual constituent objects, providing another way to control and adjust the density or complexity of a given visual data display. The procedure can be repeatedly used on a given data set to provide drill-down and drill-up views of a data set.

The present invention exhibits a number of advantages over the related art. Among the advantages of preferred embodiments of the present invention are the following:

The relationships between all Entities and all Concepts are plotted in a simulated three-dimensional visual space such that the relative distances between all points in the space, both Concepts and Entities, can be interpreted as measures of strength or weakness of association. In general, the closer together two items are plotted in the map, the stronger their presumed association; while the further apart they are in the map, the weaker their association.

The displayed relational structure among the data items is based upon inherent characteristics of the data items themselves, said characteristics being identified and displayed without user intervention in such a way that their contribution to the total relational structure is apparent. In this way, the invention involves extraction from the content of the item descriptions the measurement attributes used to assess the relationships among the items.

The method uses the associative structure found between all of the Concept terms associated with each Entity, and their relationships to all other Concepts, to clarify distinctions between Entities that might otherwise be ambiguous or misleading.

The resulting displayed map facilitates the user's cognitive orientation to the entire field of data and subsequent recognition of items and areas of the map that are pertinent to the user's subjective intentions. This directly addresses a problem that arises as a corollary to advances in information technology, which is the cognitive difficulty of processing large amounts of information with little context or relational structure.

The resulting map allows immediate access to the data sources represented by the Entities in the map.

In broad terms, a preferred embodiment of the invention includes using nonlinear multivariate analysis, correspondence analysis, multiple correspondence analysis, dual scaling, multidimensional scaling, reciprocal averaging, homogeneity analysis, or canonical scoring algorithms to reveal associations among documents in a given document set.

In broad terms, a preferred embodiment of the invention is also a method for extracting inherent and implicit conceptual relationships and semantic associations existing among items in a data set, and for representing those associations in a simulated three-dimensional space, said method comprising the steps of:

organizing said items into a plurality of data pairs, each data pair comprising an entity label and a textual or symbolic description of the entity;

creating a modified set of entity descriptions by pruning irrelevant terms from entity description lists and reducing each remaining term to a linguistic root form;

extracting concepts from said modified description set, each concept comprising a root term that appears in at least two modified descriptions of at least two entities;

producing a similarity matrix wherein each entity is represented as a column item in said matrix and each concept is represented as a row item, or vise versa, the element of each such column and row pair containing a binary indication of whether the corresponding concept is present in the corresponding entity's modified description list;

quantifying the associative structure of the data set by subjecting the similarity matrix to procedures comprising a statistical method known as correspondence analysis, in combination with auxiliary matrix transformation operations described herein, thereby producing a set of coordinates for each concept and each entity in a computer-simulated, multi-dimensional Euclidean space; and displaying the concepts as one type of virtual object and the entities as another type of virtual object with each object located at the appropriate coordinates in the multi-dimensional space, wherein the relative distances among the concept objects reflect the degree to which the concepts are associated with one another, wherein the relative distances among the entity objects reflect the degree to which the entities are associated with one another and wherein the relative distance between each concept object and each entity object reflects the degree to which each entity is associated with each concept.

In a preferred embodiment, the method also comprises allowing the viewer to adjust the granularity of the concept extraction process and the density of the concept and entity display, as well as the scaling method to be used in the analysis.

In broad terms, a preferred embodiment of the invention is also a system for identifying and displaying inherent semantic constructs in a data set, such as one comprised of a plurality of World Wide Web sites or pages and their descriptions, said constructs which are held in common by more than one entity of said data set, in a manner such that the strength of semantic association between all data entities and identified concepts are represented as visually-observable distances between data points in an n-dimensional Euclidean space, said system comprising:

- a network of computers, said network comprising interconnected server computers and client computers, some of said server computers storing and serving web sites having contents,
- means for producing a data set residing in said network, said data set comprising a plurality of data pairs, each data pair comprising a label for a web site and a textual or symbolic description of the web site;
- means for creating a modified set of web site descriptions by pruning irrelevant terms from web site description lists and reducing each remaining term to a linguistic root form;
- means for extracting concepts from said descriptions residing in said network, each concept comprising a root term that appears in more than one description;
- means for producing a similarity matrix residing in said network, wherein each web site ts is represented as a column and each concept is represented as a row or vise versa, the element of each such column and row containing a binary indication of whether the concept is found in the corresponding web site's modified description list;
- means for quantifying the associative structure of the data set by subjecting the similarity matrix to means for correspondence analysis in combination with auxiliary matrix transformation operations residing in said network, thereby producing the coordinates of each concept and each web site in a multi-dimensional Euclidean space; and
- means for displaying the concepts as one type of virtual object and the web sites as another type of virtual object with each object located at the appropriate coordinates in the multidimensional space, said means for displaying residing in a client computer, wherein the distances among the concept objects reflect the degree to which the concepts are associated with one another, wherein the distances among the entity objects reflect the degree to which the entities are associated with one another and wherein the distance between each concept object and each web site object reflects the degree to which the content of each web site is associated with each concept.

The invention can be applied to a data source on an intranet, for example, the U.S. Patent Office's patent database. And/or, it can be embedded in a Help system, like Microsoft Help, as an alternative way to view the data store of Help topics, or subsets thereof In broad terms, a preferred embodiment of the invention is a computer-readable medium having stored thereon sequences of instructions which when executed by a processor cause the processor to perform the steps of:

- acquiring a data set comprised of items;
- organizing the items into a plurality of data pairs, each data pair comprising an entity and a description of the entity;
- creating a modified set of entity descriptions by pruning irrelevant terms from entity description lists and reducing each remaining term to a linguistic root form;
- extracting concepts from said modified description set, each concept comprising a root term that appears in more than one modified description;
- producing a contingency matrix wherein each entity is a column and each concept is a row or vise versa, the element of each such column and row containing a binary indication of whether the concept is found in the entity description;
- quantifying the associative structure of the data set by manipulating the contingency matrix as follows:
- collapsing identical row profiles and combining the concept terms associated with each into a single complex term,
- subjecting the contingency matrix to singular value decomposition and other mathematical operations to produce an n-dimensional representation of the contingency matrix in Euclidean space, and
- scaling said raw coordinates to produce coordinates of each concept and each entity usable in a given computer-simulated, three-dimensional space; and
- displaying the concepts as one type of virtual object and the entities as another type of virtual object on said monitor or projection device with each object located at the appropriate coordinates in the three-dimensional space, wherein the relative distances among the concept objects reflect the degree to which the concepts are associated with one another, wherein the relative distances among the entity objects reflect the degree to which the entities are associated with one another and wherein the relative distance between each concept object and each entity object reflects the degree to which each entity is associated with each concept.

In a preferred embodiment, the invention is a computer-readable medium having stored thereon sequences of instructions which, when executed by a processor, cause the processor to perform the steps of a method disclosed herein. The computer-readable medium may be a disk, a CD-ROM, a tape, a hard drive or any conventional medium. In an alternative embodiment, a preferred embodiment of the invention is a method for operating a server computer, the server computer having a computer-readable medium having stored thereon sequences of instructions which may be executed by a processor, said method comprising serving to a client computer having said processor the sequences of instructions that cause said processor to perform the steps of a method disclosed herein.

A preferred embodiment of the invention is also a business method that involves the step of displaying to a user in a visual display implicit associations among a plurality of items in a loosely-structured data set in accordance with a method disclosed herein and the step of generating a billing charge producing business income from the displaying step. Business income is generated by obtaining the identity of said user (by means of information obtained from a cookie, form or credit card company) and charging the user for the privilege of viewing the display, by charging advertisers for posting advertisements within or in proximity to said visual display, by charging users a subscription or licensing fee in exchange for granting the user access to the display over a period of time or at a certain frequency, by licensing the invention to those in the business of organizing or presenting data sets, or by conventional means.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS FOR THE DRAWING(S)

The features of the invention will be better understood by reference to the accompanying drawings which illustrate presently preferred embodiments of the invention. In the drawings:

FIG. 1 is a flowchart that presents a simplified overview of one embodiment of the present invention illustrating the main procedural steps and sequential activities involved in the production of a result map.

FIG. 1-A is a schematic flowchart that presents a version of the step of processing raw data into Entity: Description pairs FIG. 1-B is a schematic flowchart that shows a version of the steps used to extract associative terms, or Concepts, from the Entity: Description pairs.

FIGS. 1-C-1 and 1-C-2 are schematic flowcharts that show one version of matrix operations used to analyze associative patterns among items in the Entity: Description set, and to generate Z, Y, and Z coordinates for the Entities and Concepts.

FIG. 1-D is a schematic flowchart that shows one version of the steps involved in preparing Entities and Concepts for projection in a three-dimensional computer-simulated space.

FIGS. 2 through 12 present computer screen shots of plots resulting from the dual-scaling exercises disclosed in the Working Example section of this document.

The following reference numerals are used to indicate the parts and environment of the invention on the drawings:

10 Raw data source, unprocessed
    10.1 Step to identify Entities in unprocessed data set
    10.2 Step to identify initial Description list for each Entity
12 Step to process data into Entity-Description pairs
14 Raw data source, pre-processed into directly-accessible Entity: Description lists
16 Step to index and store Entity: Description pairs
28 Step to store Entities for use in matrix construction
18 Step to store Description lists for use in extraction of Concepts
20 Procedures for processing and pruning original Description list for each Entity
    20.1 Step to remove noise words and irrelevant terms from Description lists
    20.2 Step to reduce remaining Description list words to root terms
    20.3 Software libraries and routines used in extraction of Concepts step
22 Step to identify Concepts from pruned Description lists
24 Step to store unique Description lists for each Entity
26 Step to store Concept terms from Description lists and store in indexed lists for use in matrix construction
30 Step to produce initial data input matrix from Entity and Concept items

32 Steps to submit initial matrix to modified correspondence analysis procedures
    32.1 Shows input matrix consisting of i columns and j rows of binary values, and row and column marginals
    32.2 Shows input matrix as a factor in normalizing procedure to produce matrix H
    32.3 Shows diagonal matrix of reciprocals of square roots of row marginals as a factor in matrix H normalization
    32.4 Shows diagonal matrix of reciprocals of square roots of column marginals as a factor in matrix H normalization
    32.5 Shows resulting normalized matrix H
    32.6 Step to submit normalized matrix to singular value decomposition (SVD) procedures
    32.7 Shows diagonal matrix P from SVD procedure for use in matrix transformation operations
    32.8 Shows diagonal matrix Q' from SVD procedure to be used in matrix transformation operations
    32.9 Shows diagonal matrix of "singular values" of matrix H
    32.10 Step to apply matrix transformation operations to allow interpretable scaling between column and row items
    32.11 Table of coordinates representing the first three dimensions of the correspondence analysis solution of the transformed matrix H for column items: to be used in production of the result map
    32.12 Table of coordinates representing the first three dimensions of the correspondence analysis solution of the transformed matrix H for row items: to be used in production of the result map
34 Steps to store Entity and Concepts coordinates to be used in display of the result map
36 Steps to scale Entity and Concepts coordinates to fit visual display frame
38 Step to retrieve Entity-indexed Unique Description list and store in a format expected by the selected display engine
40 Step to project Entity and Concept items, using calculated X, Y, and Z coordinates, as visual objects in a computer-simulated three-dimensional space
    40.1, 40.2, 40.3, 40.4 Illustrate Concept labels
    40.5 Illustrates optional Concept shape
    40.6 Illustrates optional an Entity shape
    42.7 Illustrates an accessed Unique Description list for Entity 1
42 Represents options for user refinements and customizations of the basic process and methodology.

DETAILED DESCRIPTION OF THE INVENTION procedural steps which define a preferred embodiment of the present invention are illustrated FIG. 1. The first step, processing of raw data, is represented in FIG. 1A. Two types of input sources are indicated: unprocessed raw data 10, and preprocessed raw data 14. This is to indicate that the invention encompasses various "front-end" processing operations, when necessary, to format input data into the required simple Entity: Description structure. The invention is not limited to any specific mechanism disclosed herein for the initial organization of input data.

The set of Description lists for the Entities 18 is processed to extract root terms, referred to as Concepts, that will be used to measure associations between Entities and also to produce a list of uniquely descriptive terms for each Entity: see FIG. 1-B. The Entity Description lists are reduced or "pruned" 20.1, by removing articles, forms of to be, and other irrelevant terms. In a preferred embodiment, commercial software libraries are used for this task.

The next step is to reduce each remaining term to its linguistic root form: for example, "analyze ", "analyzing", "analyzed" are replaced with the root term "analysis"; gardening", "gardener" and "gardens" are replaced by the root term "garden". Terms are reduced to the root noun form if possible, otherwise the root verb form, otherwise root adjective or adverb form. In a preferred embodiment, the list of terms can be tailored by the user to produce optimal results. In a preferred embodiment of the present invention, the user can specify the types of terms to be considered in the overall analysis. For example, filtering adverbs out of the Entity Description lists eliminates terms such as "quick" and "hot", but not "fast", since the term "fast" could be the root noun of "fasting". The product of these operations is a set of modified Entity Descriptions, which are preferably in the form of lists of terms.

The next step is to identify Concept terms in the modified Entity Description lists. These are used to measure or quantify associations between Entities. In a preferred embodiment, a Concept is a grammatically-correct term (word or group of words) in the set of pruned or modified Entity Description lists that is associated with more than one Entity, at minimum, two of the Entities in the data set. In another preferred embodiment, the associative granularity can be set by the user on a graduated scale, for example as a percentage threshold of Entities which must be associated with a given term before it can be considered and used as a Concept. Another preferred embodiment allows all root terms to be displayed, either in addition to, or in place of Concept terms. The non-Concept root terms can be displayed in close proximity to their associated Entities without affecting placement of objects in the space as determined by Concept terms.

In an alternative embodiment, the input data for the method is a set of documents that have been marked up to reveal data structure using a markup language such as Standard Generalized Markup Language (SGML) or Extensible Markup Language (XML). In this embodiment, concepts are obtained by processing (e.g., pruning) lists of the elements or tags of such documents and/or by processing the Document Type Definitions (DTD's) of such documents.

Each Entity's Description list comprises a unique description for that Entity. Items in the Entity's Description list can include URL's and hyperlinks. After the Concept identification step, Description lists are stored 24 for later display with Entities in the result map.

The Entities identified and stored in Raw Data Processing step 28, and the Concepts identified and stored in the Extraction of Associative Terms step 26 are used to define the column and row items, respectively, of a matrix E, the input data set 30, which is used in the Analysis of Associative Structure procedure, FIG 1-C. In Matrix E, column items 1 . . . i represent Entities and row items 1 . . . j represent Concepts. The intersecting column-row, or Entity-Concept, elements contain binary values: 1 if that Concept was originally found in that Entity's Description list, otherwise 0. The marginal sums of the rows and columns are represented by entries r1 . . . rj and c1 . . . ci in matrix E. Steps 32.2, 32.3, and 32.4 represent normalization procedures required by the particular form of dual-scaling used in this example, namely correspondence analysis, which result in the production of normalized Matrix H. Step 32.6 uses singular value decomposition to obtain three decomposed matrix representations of H which is used in the final scaling algorithm. Step 32.10 represents the final scaling algorithm, using results obtained in steps 32.1 through 32.9. In a preferred embodiment, these steps correspond to the methods and formulas described in the Working Example section regarding modifications to the standard correspondence analysis procedures which facilitate inter-column-row comparisons among items in the result map. This does not imply limitations or restrictions as to the type of dual-scaling operations that may be used to produce the required results. Application of the formulas in step 32.10 result in tables of coordinate values for Entity and Concept items. Steps 32.11 and 32.12 represent the coordinate tables for the first three dimensions of the correspondence analysis solution for the original Entity-Concept matrix E. These values will be used to plot the X, Y, and Z positions of Entities and Concepts in the computer-simulated three-dimensional space.

The X, Y and Z coordinates in the dual-scaling results tables are subjected to various normalizing operations, such as a matrix transformation or adjusting origin points and scale to accommodate the requirements of the three-dimensional simulation software used to display the results on a computer screen 36. For the purposes of the present invention, such software might be a commercially-available 3-D engine such as Superscape 3D Webmaster ™, which was used in the original reduction to practice of the subject invention, described herein, or custom created software using 3-D simulation libraries, as in the current demonstration prototype of the invention. The software medium, be it commercial or proprietary, performs the function of displaying three-dimensional shapes which represent Entities and Concepts in a simulated three-dimensional space such that the initial positions of the Entity and Concept shapes in the space are determined by the X, Y, and Z coordinates resulting from the enhanced correspondence analysis results. The modified coordinate table is stored with its associated Entity and Concept indexes for input to the 3-D simulation routines 36.

FIG. 1-D illustrates the Visual Display of Results procedure. In step 38, the Unique Description terms for each Entity are stored with their respective Entity labels in a format compatible with the three-dimensional simulation engine being used. In a preferred embodiment, users access additional information about Entities typically via a mouse click. The three-dimensional display engine has the capability of interpreting hyperlink and URL references in Unique Description lists to provide users with direct access to other data sources.

In step 40, two sets of variables, Entities and Concepts, are projected and displayed as computer-simulated three-dimensional objects in a computer-simulated three-dimensional space at the positions previously calculated in the Analysis of Associative Structure procedure, FIG. 1-C. A preferred embodiment of the present invention does not impose limitations on the specific shapes used to represent Entities. For example, a "sun and planets" design or some other design could be used. The Working Example presented below uses sphere-shaped objects of the same color to represent Entities, for example, but they could also be represented by icons obtained directly from the Entity's source. The set of Concept objects and the set of Entity objects are preferably visually distinct from each other in some way. In the Working Example, for example, Entities are displayed as 3-D spheres and Concepts are displayed as 3-D pyramidal shapes in the original working prototype of the invention, and as wire-form spheres in the current prototype, along with their identifying text labels. The size of each object as it changes in relation to the Z-axis, i.e., as the viewer moves closer to or further from the object in the simulated space, offers perceptual cues regarding its distance from other objects in the space. In a preferred embodiment, the user can specify whether text labels for Entities and Concepts are fixed in size or scalable along the Z axis in the same way that the 3-D shapes are.

In a preferred embodiment, Concept labels are visible by default and Entities labels are not visible by default, although both of these settings can be altered by the user. The user typically views Entity labels and their associated unique Descriptions by selecting the Entity shape with a mouse or other input device. (See FIG 1-D, 40.6 and 40.7 for a representation of the general concept.) The initial result map, before any action on the part of the user, visually consists of text labels identifying Concepts which are displayed in a three-dimensional space, among which are interspersed 3-D shapes representing Entities in the original data set Selecting an Entity object in the simulated space, for example using a mouse device, will display its Description, or some part of it. The Description, or the visible label of the Entity object itself, may contain a Hyperlink or URL link to the original source represented by that Entity object, which can be accessed by the viewer. Selecting an Entity object will also cause all the directly related Concepts objects to be highlighted. Conversely, selecting a Concept object will cause all the directly related Entity objects to be highlighted.

A variety of alternative embodiments are envisioned. Certain aspects of alternative embodiments of the invention have been mentioned previously: alternative front-end methods for initial data formatting, alternative methods for filtering Concept candidates and for specifying the granularity of the Concept identification process, and alternative methods for viewing the text labels associated with Entities and Concepts. These might be considered as extensions or options to the preferred embodiment, or as alternative embodiments, or both. FIG. 1, step 42, represents the set of user-controllable refinements to the result map which are included in the preferred embodiments. These preferred or alternative embodiments include, but are not limited to, the following:

a) Ability to specify Entities in the current data set to be retained and added to a new data set, in combination with the ability to re-run the methods of the present invention on the new data set. The user specifies or selects items to be retained through a standard input device such as a mouse. In practical terms, this allows the user to accumulate an increasingly specific set of relevant Entities, with an increasingly differentiated set of Concepts to describe them, by applying successive iterations of the present method. As a practical example, in a set of Web sites returned by a search engine, which may number in the thousands, the user typically selects the first N number of sites to submit to the methods of the present invention. The Entities identified as relevant in the first iteration of the method can be retained and added to the next N number of items selected from the total set of sites returned by the Web search, and the method rerun on the new set until the desired results are obtained.

b) Control over the granularity of Concept extraction. The baseline specification for defining a Concept is that it be a root term found in the pruned description lists of two or more Entities. That specification produces the maximum number of associative terms from the data set. A preferred embodiment of the present invention includes a means for users to specify the level of commonality among data items, ranging from the baseline minimum commonality (co-occurrence) in two Entities in the data set, to a maximum of commonality among some percentage of Entities in the data set. A specification of 100 percent would yield Concepts only from root terms found in common in every Entity in the data set. The result is that the number of Concepts displayed in the result map for a given data set can be adjusted along a scale from more to less. The advantage of being able to adjust the associative granularity of the result map is that clutter can be reduced in very large data sets, which by nature produce a large number of Concepts. Concept granularity can be increased at any time, but, typically, as the initial data set is thinned by user selection to a smaller number of Entities, greater detail in terms of associative Concepts can be displayed to a greater advantage.

c) Alternative embodiments of the invention provide a means for users to specify the exact level of commonality among data items which will result in Concept extraction, for example, users can specify that Concepts are root terms found in exactly three Entity descriptions, or exactly five Entity descriptions, and so on.

d) Ability to eliminate specified root terms from the Entity description lists as candidates for Concepts. In practical terms, this filtering allows reducing clutter in the map caused by specific, but subjectively non-relevant terms used as Concepts in the current result map. A list of Concept terms is available via pull down menu, and the user can specifically select or deselect those to be included in the analysis.

e) Ability to specify a maximum length of Description string or list per Entity to include in the input data set of Entity: Description pairs. In practical terms, this function allows reducing clutter in the result map induced by deliberate overloading of terms in Entity description lists. A practical example involving Web searches of setting a maximum limit on Description string length is to limit the effect on the overall map of Web sites which attempt to increase their "hit" potential by overloading KEWORD and DESCRIPTION lists with, for example, most of the words in the English language. The effects of this type of overloading can be reduced by restricting the length of the input Description string associated with each Entity as well as by adjusting Concept granularity, described above.

f) Alternative embodiments of the invention include the use of any statistical or mathematical procedure or algorithm which can generate relative chi-square or Euclidean distances between all items in two sets of variables such that all items in both sets can be simultaneously displayed in a "dual plot," that is, any dual-scaling procedure or algorithm. The general statistical method for dual plotting used in example throughout this document has been correspondence analysis and variations thereon, but this is not intended to limit the invention to the use of the specific dual-plotting techniques described in this document.

g) Ability to apply auxiliary statistical techniques, such as cluster analysis, principal components analysis, or similar procedures, to the result map for the purpose of collapsing data items in the map to produce a less dense and more abstract view of the entire field of data. Cluster analysis and principal components analysis techniques can be used to identify clusters of data points in Euclidean space that are statistically related to each other. The ability to identify higher-order clusters of data points among the entire field of data points allows the map to be collapsed to a much smaller number of single points, each representing a cluster of multiple data points. After clusters are identified, Concepts terms are extracted from the Descriptions of the Entities in each cluster, in much the same manner as in the original analysis, and the highest frequency Concepts for each group are visually displayed as text on the map, in much the same way as the in the complete detailed map. Selecting one of the abstract clusters, typically via mouse, unfolds the cluster to reveal the detailed Entities and Concepts therein. The major advantage provided by this abstracting functionality is that very large data sets can be processed and presented to the viewer without the cognitive overload and perceptual confusion that would result from attempting to display several thousand data points at once. The viewer is able to select the abstract clusters which seem to be of interest, and then drill down to a detailed level.

h) Ability to apply auxiliary statistical techniques, such as cluster analysis and principal components analysis, to the result map for the purpose of aiding in the identification of related clusters of Entities at a detailed level. Clusters identified through such means can be distinguished by assigning unique colors to different clusters, for example, or by other means for producing a visual distinction between clusters of statistically-related Concepts and Entities.

i) Ability for the user to quickly specify the desired perspective and orientation to the total map, and to specify close up views of particular Concepts or Entities. The primary mode of "navigation" through the simulated 3-D space is one of continuous and smooth motion, as if the viewer were flying through the space with the ability to navigate in any direction at any speed. The alternate mode of navigation provides the viewer with thumbnail views of the total space from the perspective of the three dimensions: for example, a view of the total plot from a perspective of looking "down" or being aligned with the Z-axis, the X-axis, or the Y-axis. The viewer can select a desired position in the total space based on the thumbnail views, typically with a mouse click. The selected position in the thumbnail views shifts the viewer's position and perspective in the main viewing area. Likewise, navigating through the total space shifts the orientation points in the thumbnail views, such that the viewer can see his or her overall position in the space at a glance. This allows rapid orientation and movement through large or complex result maps. Concept and Entity names are also accessible from lists in pull-down menus. Selecting a Concept or Entity name from the lists immediately shifts the viewer's position in the total space to one that is in close proximity to the selected item.

j) Shapes, colors, and other physical characteristics of displayed 3-D objects, or the manner in which Entity Descriptions are accessed and viewed, and any other general screen layout in the current prototype of the invention do not imply limitations in screen format or screen design, or in 3-D rendering effects of the preferred or alternate embodiments of the invention.

k) Alternative embodiments may map the three-dimensional results onto non-empty three-dimensional spaces, for example, three-dimensional geographical maps, or other predetermined three dimensional representations.

l) Alternative embodiments of the invention may use other than the preferred methods for Concept identification within the target data set. Alternate embodiments may also encompass methods for creating and structuring the target data set itself.

m) There are a number of alternative ways to implement the initial data organization step, i.e., the step of obtaining the desired data in Entity : Description format. Several are described below.

A preferred embodiment of the invention works in conjunction with a search engine on the World Wide Web. The search engine may be specifically constructed as a modular front-end extension to the software which performs the Concept identification and dual scaling analysis. Users perform a Web search using the search engine; Entity: Description lists are constructed from the returned results of the search, processed, analyzed, and displayed in a 3-D browser. From there, users would access remote links in the Entities Description lists.

Alternately, existing commercial search engines could provide the invention with their search results in Entity: Description format, or other easily converted format, for use as input to the dual scaling operation. This would obviously involve formal agreements of various types with search engine companies. In that case, the front-end processing would involve simple formatting of data provided by an external source. Such an embodiment of the invention might be in the form of a "plug-in" enhancement for existing browsers or search engines, or as a standalone application using three-dimensional simulation techniques compatible with existing World Wide Web technology.

In a preferred embodiment, the invention is implemented as a displaying step in a business method that also comprises the step of generating income or a billing charge as a result of an occurrence of a display produced by the displaying step. The billing or income-producing step may involve charging a user for the privilege of viewing a display produced by said display generating step, charging advertisers for posting an advertisement within or in proximity to said display, licensing the invention to a party involved in electronic data storage and retrieval or one involved in searching or organizing pages or sites on the World Wide Web or one involved in querying one or more databases or data files.

An alternate non-Web-based embodiment, or use, of the invention is for representing associations between Concepts and Entities in large data sets such as electronic documents, personnel databases, and large informational databases such as that maintained by the U.S. Patent and Trademark Office. In this case, the invention's front-end process would be a data-passing interface to the search engine typically used with that database: details would depend on the database and the search engine.

An embodiment of the invention that has been actually reduced to practice, for example, includes a Perl language based pre-processing routine which can be used with unstructured text files, such as electronic versions of newspapers, periodicals, and books, and which extracts Entity: Description data from such sources based on user supplied search terms.

Another alternative embodiment and use of the invention is for dual plotting of manually-submitted input data, such as that used for an example presented in the Working Example section below. In this case, input can come from a simple text/word processor or spreadsheet. In this embodiment, the creator of the data set need only remember to quote the initial Entity labels.

a) Alternate embodiments of the invention may offer viewers a programmatically guided tour or determined path of navigation through the visual data space, perhaps combined with a programmatically determined set of visual perspectives on the data These in turn may be combined with the summarizing, encapsulating, or clustering techniques for handling very large target data sets which were previously referenced in regard to alternative embodiments of the invention.

b) No limitations are implied as to the architecture or medium of delivery of the preferred or alternative embodiments of the invention. Software that comprises the invention may be fielded as a stand-alone application with configurable front end, as a tool or utility integrated within another application such as a search engine or Help function, as part of distributed application working in conjunction with a centralized server, or in various other configurations.

c) Likewise, no limitations are implied as to any business methods within which the invention may ultimately be deployed.

WORKING EXAMPLES

A first working example illustrates the operation of a preferred embodiment of the invention. The first step involved obtaining the input data. The input data set consisted of Entity :Description pairs, where Entity is the label of a data item, in quotes, and Description was any text string following the label (typically ended with a newline character). In the following simple example data set, which was based on members of the inventor's family, "Seth" was a data Entity, and the string—is in his twenties He is computer engineer He likes sailing and science fiction He is married to Floria and lives in Redwood City—was the Description of the Entity "Seth". The Descriptions were composed in a natural language format, albeit somewhat simplified and short for the purposes of this exercise. The input data set in the example was a little unusual in that some objects, such as "Johanna", could also be subjects, such as in the Description for "Rebecca" which included: "is the mother of Seth and Johanna". A listing of the Entity: Description data set used in this exercise follows:

Entity: Description pair #1:
"Seth" is in his twenties He is computer engineer He likes sailing and science fiction He is married to Floria and lives in Redwood City Entity: Description pair #2:
"Floria" is in her twenties She is a teacher who is from Costa Rica She is also studying language She is married to Seth and lives in Redwood City Entity: Description pair #3:
"Rebecca" is in her fifties She is the mother of Seth and Johanna She is a teacher and is also studying music She is married to Doug and lives in Redwood City Entity: Description pair #4:
"Doug" is his fifties He is the father of Seth and Johanna He is a computer engineer He is married to Rebecca and lives in Redwood City Entity: Description pair #5:
"Johanna" is in her twenties She plays music and works as an administrative assistant She lives in San Francisco and is married to Kiley Entity: Description pair #6:
"Kiley" is in his twenties He plays music and is a sound engineer He lives in San Francisco and is married to Johanna The second step involved identification of the Entities. The Entity items, which are the quoted items at the begin ning of each Entity: Description pair, were stored in an indexed list:

Entity #1: Seth
Entity #2: Floria
Entity #3: Rebecca
Entity #4: Doug
Entity #5: Johanna
Entity #6: Kiley The third step involved processing of the description lists. The description lists were pruned in various ways: punctuation, noise words and other irrelevant terms were removed from each list, capitalization was standardized, and the remaining terms were converted to their root forms. Most likely, a thesaurus software library or other linguistic library will eventually be used to complete the full round of processing of the Description lists, although a custom library may be created. The Description list processing step will be modifiable by the user, who can choose to retain or eliminate various word types from Description lists, such as pronouns, adverbs, acronyms, etc. The user can also choose to eliminate specific terms from the Description lists: e.g., if every Description list for every Entity in the target data set includes the term "Engineer", the user might want to specify that "Engineer" should be eliminated from the Description lists, the rationale being that "Engineer" is a known quality describing the entire group and therefore offers nothing in the way of discriminating among data Entities.

In the current working model, which is implemented as a computer program written in the C++ language, a very basic series of if statements were used to remove several of the most common articles, forms of to be, etc., from the Description lists. This is a stub or point of beginning for the more extensive processing included in the preferred embodiment. Submitting each of the original Description lists to the current simple pruning function returned the following "pruned" Description lists:

Pruned Description list #1:
his twenties He computer engineer He likes sailing science fiction He married Floria lives Redwood City Pruned Description list #2:
her twenties She teacher Costa Rica She studying language She married Seth lives Redwood City Pruned Description list #3:
her fifties She mother Seth Johanna She teacher studying music She married Doug lives Redwood City Pruned Description list #4:
his fifties He father Seth Johanna He computer engineer He married Rebecca lives Redwood City Pruned Description list #5:
her twenties She plays music works administrative assistant She lives San Francisco married Kiley Pruned Description list #6:
his twenties He plays music sound engineer He lives San Francisco married Johanna The next step, identification of concept terms, involves extracting common terms found among the pruned Description lists for each Entity. These common terms became Concepts, to be used to form a measure of association with each Entity. The Concepts comprise the row items in the similarity matrix. There can be a number of alternative methods for accomplishing this step, and the intention is for the alternatives to be selectable by the user. A preferred baseline definition of a Concept is that it is a term found in more than one pruned Description list. However, the granularity of the extracted Concepts can be varied if the user specifies, for example on an adjustable scale, that a term must appear in at least 50 percent of all pruned Description lists before it is defined as a Concept. The user also has the option of eliminating specific terms from consideration as Concept candidates. For the present working example, the baseline Concept definition has been used: a Concept is a term found in more than one pruned Description list. Using that definition, the following Concepts were extracted from the pruned Description lists in the example:

Concept 1: Francisco
Concept 2: San
Concept 3: plays
Concept 4: music
Concept 5: Johanna
Concept 6: fifties
Concept 7: Seth
Concept 8: studying
Concept 9: teacher
Concept 10: She
Concept 11: her
Concept 12: City
Concept 13: Redwood
Concept 14: lives
Concept 15: married
Concept 16: engineer
Concept 17: computer
Concept 18: He
Concept 19: twenties
Concept 20: his The next step, construction of the similarity matrix, involves constructing the similarity or contingency matrix that will provide the input to the dual scaling procedure, which in this particular example was a variant of the correspondence analysis. The methodology and procedure is as follows: Entities (i.e., "Seth", "Floria", . . . etc.) were represented as column items in the matrix and Concepts (i.e., "Francisco", "San", "music", "plays", . . . etc.) were represented as row items in the matrix. The value in each intersecting element of the matrix was "1" if that Concept was originally found in the pruned Description list for that Entity, otherwise it was "0". The C++ code on shown below was used to construct a binary similarity matrix from the list of Entities and the list of Concepts:

```
void CThreedeApp::CreateSimilarityMatrix( )
{
    PROOT_WORD root;
    PDATA_ITEM dataItem;
    ULONG concepts = 1;
    PROOT_WORD previous= NULL;
    PROOT_WORD freeIt = NULL;
    m_similarityMatrix = new Matrix(m_totalRootWords-1, m_totalDataItems-1);
    *m_similarityMatrix = 0;
    previous = NULL;
    root = m_rootWordHead;
    while( root )
    {
        if( root->count == 1 )
        {
            if( root == m_rootWordHead )
            {
                m_rootWordHead = root->next;
            }
            else
            {
                previous->next = root->next;
            }
            freeIt = root;
        }
        else
        {
            root->index = concepts++;
            previous = root;
        }
        root = root->next;
        if( freeIt )
        {
            free( freeIt );
            freeIt = NULL;
        }
    }
    m_totalRootWords = concepts;
    for( root=m_rootWordHead; root != NULL; root = root->next )
    {
        for( dataItem = m_dataItemHead; dataItem != NULL; dataItem = dataItem->next )
        {
            if( strstr( dataItem->description, root->name ) != NULL )
            {
                (*m_similarityMatrix)( root ->index, dataItem->index ) = 1;
            }
        }
    }
}
```

The initial results output by the above code are shown here:

|  | Seth | Floria | Rebecca | Doug | Johanna | Kiley |
|---|---|---|---|---|---|---|
| Francisco | 0.000000 | 0.000000 | 0.000000 | 0.000000 | 1.000000 | 1.000000 |
| San | 0.000000 | 0.000000 | 0.000000 | 0.000000 | 1.000000 | 1.000000 |
| plays | 0.000000 | 0.000000 | 0.000000 | 0.000000 | 1.000000 | 1.000000 |
| music | 0.000000 | 0.000000 | 1.000000 | 0.000000 | 1.000000 | 1.000000 |
| Johanna | 0.000000 | 0.000000 | 1.000000 | 1.000000 | 1.000000 | 1.000000 |
| fifties | 0.000000 | 0.000000 | 1.000000 | 1.000000 | 0.000000 | 0.000000 |
| Seth | 1.000000 | 1.000000 | 1.000000 | 1.000000 | 0.000000 | 0.000000 |
| studying | 0.000000 | 1.000000 | 1.000000 | 0.000000 | 0.000000 | 0.000000 |
| teacher | 0.000000 | 1.000000 | 1.000000 | 0.000000 | 0.000000 | 0.000000 |
| She | 0.000000 | 1.000000 | 1.000000 | 0.000000 | 1.000000 | 0.000000 |
| her | 0.000000 | 1.000000 | 1.000000 | 1.000000 | 1.000000 | 0.000000 |
| City | 1.000000 | 1.000000 | 1.000000 | 1.000000 | 0.000000 | 0.000000 |
| Redwood | 1.000000 | 1.000000 | 1.000000 | 1.000000 | 0.000000 | 0.000000 |
| lives | 1.000000 | 1.000000 | 1.000000 | 1.000000 | 1.000000 | 1.000000 |
| married | 1.000000 | 1.000000 | 1.000000 | 1.000000 | 1.000000 | 1.000000 |
| engineer | 1.000000 | 0.000000 | 0.000000 | 1.000000 | 0.000000 | 1.000000 |
| computer | 1.000000 | 0.000000 | 0.000000 | 1.000000 | 0.000000 | 0.000000 |
| He | 1.000000 | 0.000000 | 0.000000 | 1.000000 | 0.000000 | 1.000000 |
| twenties | 1.000000 | 1.000000 | 0.000000 | 0.000000 | 1.000000 | 1.000000 |
| his | 1.000000 | 0.000000 | 0.000000 | 1.000000 | 0.000000 | 1.000000 |

Several of the row vectors in the initial result matrix have identical values. This has obvious face validity in some cases, such as in the case of Francisco (Concept 1) and San (Concept 2), which compose a multi-term Concept in reality, in this case. In other cases, such as engineer and He, the identical row profiles result from the relationships of those Concepts to the people who comprise the Entities. (Note also that this example data set is somewhat unusual in that some of the same terms are used as both Entities and Concepts, namely the people, who can be both objects and subjects in this case.) The end result of allowing identical row profiles in the input matrix is that the Concepts represented by those row profiles were plotted exactly on top of each other in the output medium, making them difficult or impossible to identify or discriminate. There are solutions to such "collision" problems on the 3-D graphics side, and the description of the invention does not preclude the use of such mechanisms. In the present working example, however, the collision problem was handled by eliminating duplicate rows and concatenating the Concept labels from the duplicate rows. Since this is done prior to submitting the matrix to the dual scaling operation, multiple points that would have been plotted in exactly the same spot are plotted as one point with a concatenated label. For example, reduction of the initial similarity matrix above yielded:

Row 1 and 2 are the same
Row 1 and 3 are the same
Row 7 and 12 are the same
Row 7 and 13 are the same
Row 8 and 9 are the same
Row 14 and 15 are the same
Row 16 and 18 are the same
Row 16 and 20 are the same
Copying Row 1
Copying Row 4
Copying Row 5
Copying Row 6
Copying Row 7
Copying Row 8
Copying Row 10
Copying Row 11
Copying Row 14
Copying Row 16
Copying Row 17
Copying Row 19

|  | Seth | Floria | Rebecca | Doug | Johanna | Kiley |
|---|---|---|---|---|---|---|
| Francisco, San, plays | 0.000000 | 0.000000 | 0.000000 | 0.000000 | 1.000000 | 1.000000 |
| music | 0.000000 | 0.000000 | 1.000000 | 0.000000 | 1.000000 | 1.000000 |
| Johanna | 0.000000 | 0.000000 | 1.000000 | 1.000000 | 1.000000 | 1.000000 |
| fifties | 0.000000 | 0.000000 | 1.000000 | 1.000000 | 0.000000 | 0.000000 |
| Seth, City, Redwood | 1.000000 | 1.000000 | 1.000000 | 1.000000 | 0.000000 | 0.000000 |
| studying, teacher | 0.000000 | 1.000000 | 1.000000 | 0.000000 | 0.000000 | 0.000000 |
| teacher | 0.000000 | 1.000000 | 1.000000 | 0.000000 | 0.000000 | 0.000000 |
| She | 0.000000 | 1.000000 | 1.000000 | 0.000000 | 1.000000 | 0.000000 |
| her | 0.000000 | 1.000000 | 1.000000 | 1.000000 | 1.000000 | 0.000000 |
| lives, married | 1.000000 | 1.000000 | 1.000000 | 1.000000 | 1.000000 | 1.000000 |
| engineer, He, his | 1.000000 | 0.000000 | 0.000000 | 1.000000 | 0.000000 | 1.000000 |
| computer | 1.000000 | 0.000000 | 0.000000 | 1.000000 | 0.000000 | 0.000000 |
| twenties | 1.000000 | 1.000000 | 0.000000 | 0.000000 | 1.000000 | 1.000000 |

Subsequently, the concatenated set of Concept terms were as follows:

Concept 1: Francisco, San, plays
Concept 2: music
Concept 3: Johanna
Concept 4: fifties
Concept 5: Seth, City, Redwood
Concept 6: studying, teacher
Concept 7: She
Concept 8: her
Concept 9: lives, married
Concept 10: engineer, He, his
Concept 11: computer
Concept 12: twenties The next step is analysis of the similarity matrix. In formulaic terms, this involved performing the following analysis, which is a variation of correspondence analysis, on the similarity matrix produced in the steps above:

$$X = R^{-\frac{1}{2}} P (\Delta+I)^{1/2}$$

$$Y = C^{-\frac{1}{2}} Q (\Delta+I)^{1/2}$$

where X and Y are rectangular matrices consisting of Euclidean coordinates for the row items (X) and the column items (Y) in the original input similarity matrix. In these equations, $R^{-\frac{1}{2}}$ and $C^{-\frac{1}{2}}$ are diagonal matrices whose entries consist of reciprocals of the square roots of the row marginals and column marginals, respectively, of the original input similarity matrix. P and Q are matrices resulting from the Eckart-Young decomposition, or singular value decomposition, of the input matrix. $\Delta$ is a diagonal matrix of singular values obtained from the decomposition of the original similarity matrix, and I is the identity matrix obtained from the same table. The number of columns in the X and Y matrices is determined by the number of columns in the matrix of singular values, $\Delta$. This is this number of "dimensions" required to obtain the full solution to the singular value decomposition of the original input matrix. The above equation represents the alternate scaling of the standard correspondence analysis formula. This approach, in effect, distributes the influence of the singular values across both row and column items. The standard correspondence analysis formula is written as such:

$$X = R^{-\frac{1}{2}} P \Delta$$

$$Y = C^{-\frac{1}{2}} Q$$

and represents the column-centroid scaling approach in which row items are represented as weighted centroids of the full set of column coordinates, such that the chi-square distance interpretations apply primarily to the set of row items. If the matrix of singular values, $\Delta$, is applied to the column items rather than the row items, the reverse is true: chi-square distance interpretations are most accurate for column items, which would presumably be the variable set of primary interest if that approach was selected. The preferred embodiment of the invention offers the user a selection of dual-scaling alternatives, and is not limited to any specific dual-scaling method.

The custom-written working example C++ program from which the output discussed above was taken uses a freeware C++ library of matrix algebra routines called Newmat09, which can be obtained from the following http URL webnz.com/robert/download. It was used to perform the matrix operations described below. The library provides functions for standard matrix operations such as summing column and row vectors, and also provides standard math operators such as square root, etc., as illustrated immediately following. In addition, the library provides a function for the singular value decomposition, which is an element in several of the methods that can be used to produce the dual-scaling solution required by the invention. The actual code used to produce the output displayed below is not listed for simple operations known to those skilled in the art.

STEP A: Get row and column marginals. (RV(x) ='row vector x' and CV(x) ='column vector x').

Sum for m_RV(1) =2.000000
Sum for m_RV(2) =3.000000
Sum for m_RV(3) =4.000000
Sum for m_RV(4) =2.000000
Sum for m_RV(5) =4.000000
Sum for m_RV(6) =2.000000
Sum for m_RV(7) =3.000000
Sum for m_RV(8) =4.000000
Sum for m_RV(9) =6.000000
Sum for m_RV(10) =3.000000
Sum for m_RV(11) =2.000000
Sum for m_RV(12) =4.000000
Sum for m_CV(1) =5.000000
Sum for m_CV(2) =6.000000
Sum for m_CV(3) =8.000000
Sum for m_CV(4) =7.000000
Sum for m_CV(5) =7.000000
Sum for m_CV(6) =6.000000

STEP B: Get the square roots and the reciprocals of the square roots of the row and column marginals.

```
sqrt(rval) for m_CV = 2.236068    m_CV(1) [1/sqrt(rval)] = 0.447214
sqrt(rval) for m_CV = 2.449490    m_CV(2) [1/sqrt(rval)] = 0.408248
sqrt(rval) for m_CV = 2.828427    m_CV(3) [1/sqrt(rval)] = 0.353553
sqrt(rval) for m_CV = 2.645751    m_CV(4) [1/sqrt(rval)] = 0.377964
sqrt(rval) for m_CV = 2.645751    m_CV(5) [1/sqrt(rval)] = 0.377964
sqrt(rval) for m_CV = 2.449490    m_CV(6) [1/sqrt(rval)] = 0.408248
sqrt(rval) for m_RV = 0.840896    m_RV(1) [1/sqrt(rval)] = 0.707107
sqrt(rval) for m_RV = 0.759836    m_RV(2) [1/sqrt(rval)] = 0.577350
sqrt(rval) for m_RV = 0.707107    m_RV(3) [1/sqrt(rval)] = 0.500000
sqrt(rval) for m_RV = 0.840896    m_RV(4) [1/sqrt(rval)] = 0.707107
sqrt(rval) for m_RV = 0.707107    m_RV(5) [1/sqrt(rval)] = 0.500000
sqrt(rval) for m_RV = 0.840896    m_RV(6) [1/sqrt(rval)] = 0.707107
sqrt(rval) for m_RV = 0.759836    m_RV(7) [1/sqrt(rval)] = 0.577350
sqrt(rval) for m_RV = 0.707107    m_RV(8) [1/sqrt(rval)] = 0.500000
sqrt(rval) for m_RV = 0.638943    m_RV(9) [1/sqrt(rval)] = 0.408248
sqrt(rval) for m_RV = 0.759836    m_RV(10) [1/sqrt(rval)] = 0.577350
sqrt(rval) for m_RV = 0.840896    m_RV(11) [1/sqrt(rval)] = 0.707107
sqrt(rval) for m_RV = 0.707107    m_RV(12) [1/sqrt(rval)] = 0.500000
```

STEP C: Normalize the original similarity input matrix. In preparation for the singular value decomposition (SVD) operation, a normalized matrix, H, is created from the original similarity input matrix, F, in the following way:

$$H = R^{-\frac{1}{2}} F C^{-\frac{1}{2}}$$

The results of this operation on the example data were as follows (row and column labels are not shown):

| -------- printing H = m__RV*m__similarityMatrix*CV -------- | | | | | |
|---|---|---|---|---|---|
| 0.000000 | 0.000000 | 0.000000 | 0.000000 | 0.267261 | 0.288675 |
| 0.000000 | 0.000000 | 0.204124 | 0.000000 | 0.218218 | 0.235702 |
| 0.000000 | 0.000000 | 0.176777 | 0.188982 | 0.188982 | 0.204124 |
| 0.000000 | 0.000000 | 0.250000 | 0.267261 | 0.000000 | 0.000000 |
| 0.223607 | 0.204124 | 0.176777 | 0.188982 | 0.000000 | 0.000000 |
| 0.000000 | 0.288675 | 0.250000 | 0.000000 | 0.000000 | 0.000000 |
| 0.000000 | 0.235702 | 0.204124 | 0.000000 | 0.218218 | 0.000000 |
| 0.000000 | 0.204124 | 0.176777 | 0.188982 | 0.188982 | 0.000000 |
| 0.182574 | 0.166667 | 0.144338 | 0.154303 | 0.154303 | 0.166667 |
| 0.258199 | 0.000000 | 0.000000 | 0.218218 | 0.000000 | 0.235702 |
| 0.316228 | 0.000000 | 0.000000 | 0.267261 | 0.000000 | 0.000000 |
| 0.223607 | 0.204124 | 0.000000 | 0.000000 | 0.188982 | 0.204124 |

STEP D: Find the singular value decomposition of H. The singular value decomposition of H can be expressed as:

$$H = P\alpha Q'$$

where P'P=Q'Q=I and $\Delta$ is a diagonal matrix of the "singular values" of the matrix H. In Newmat09 syntax, this is solved with a function call similar to the following:

SVD( *m__similarityMatrix, D, U, V, true, true);

which returns the diagonal matrix D as the equivalent of $\Delta$, the rectangular matrix U as the equivalent of P, and the rectangular matrix V as the equivalent of Q' in the equation above.

In the working example, submitting the normalized matrix H from the example above to the SVD routine in Newmat09 returned the following matrix U:

| | | | | | |
|---|---|---|---|---|---|
| −0.226455 | −0.292128 | −0.499870 | −0.029451 | −0.208457 | 0.133920 |
| −0.277350 | −0.327371 | −0.233923 | −0.219821 | 0.590003 | −0.311253 |
| −0.320256 | −0.111595 | −0.159502 | −0.433044 | −0.146937 | 0.027676 |
| −0.226455 | 0.134309 | 0.274300 | −0.582965 | 0.000657 | −0.094781 |
| −0.320256 | 0.269944 | 0.302593 | 0.159975 | 0.123282 | −0.135680 |
| −0.226455 | −0.205718 | 0.457461 | 0.204521 | −0.224727 | −0.517586 |
| −0.277350 | −0.346718 | 0.253899 | 0.172642 | 0.308384 | 0.282050 |
| −0.320256 | −0.128350 | 0.262965 | −0.093161 | −0.390826 | 0.541491 |
| −0.392232 | 0.051748 | −0.041534 | 0.113616 | −0.019693 | −0.033463 |
| −0.277350 | 0.419900 | −0.312637 | −0.011965 | −0.336235 | −0.329373 |
| −0.226455 | 0.587476 | −0.029529 | 0.021718 | 0.399074 | 0.325706 |
| −0.320256 | −0.031592 | −0.244828 | 0.551369 | −0.024584 | 0.026037 |

Returned the following matrix V:

| | | | | | |
|---|---|---|---|---|---|
| −0.358057 | 0.623443 | −0.155679 | 0.460267 | 0.493194 | −0.061585 |
| −0.392232 | −0.192181 | 0.460179 | 0.613881 | −0.469683 | −0.001753 |
| −0.452911 | −0.249206 | 0.464508 | −0.382546 | 0.436892 | −0.424010 |
| −0.423659 | 0.520828 | 0.124069 | −0.512182 | −0.408387 | 0.323647 |
| −0.423659 | −0.468978 | −0.298325 | 0.010330 | 0.254423 | 0.664491 |
| −0.392232 | −0.145188 | −0.666214 | −0.050257 | −0.329520 | −0.519735 |

And returned these values for the diagonal values of $\Delta$, i.e., the singular values of H:

D(1)=1.000000
D(2)=0.572529
D(3)=0.544242
D(4)=0.398863
D(5)=0.117310
D(6)=0.205779

An identity matrix I of the same dimensions as $\Delta$ was created:

D(1)=1.000000
D(2)=1.000000
D(3)=1.000000
D(4)=1.000000
D(5)=1.000000
D(6)=1.000000

T! is an intermediate calculation of the square root of ($\Delta$+I)

T(1)=1.414214
T(2)=1.254005
T(3)=1.242675
T(4)=1.182735
T(5)=1.057029
T(6)=1.098080

STEP E: Calculate the Euclidean distances between row and column items. Finally, the working model solved for the Euclidean coordinates representing the chi-square distances between row and column items in the original similarity matrix:

$$X = R^{-\frac{1}{2}} P (\Delta + I)^{1/2}$$

$$Y = C^{-\frac{1}{2}} Q (\Delta + I)^{1/2}$$

In Newmat09 terms, m__RowMatrix=new Matrix( U.Nrows (), U.Ncols() ); *m__RowMatrix=0; *m__RowMatrix=m__ RV * U * T; m__CoiMatrix=new Matrix( V.Nrows(), V.Ncols() ); *m__ColMatrix=; *m__ColMatrix=m__CV * V * T;

produces the following coordinate matrices for row and column items. Note that the first column of both matrices contains a constant. This corresponds to the first value in the matrix $\Delta$ which is 1.0, the so-called "trivial eigenvector", and which is ignored for purposes of the Euclidean scaling. The remaining columns, numbering five, represent the number of "dimensions of the solution that were required to explain all of the variance, or "inertia", in the original data set. In the working example, the first three dimensions were used for purposes of plotting the data set in a simulated three-dimensional display environment. Alternate embodiments of the invention include methods for absorbing into the first three solution dimensions, which are used as the X, Y, and Z coordinates for plotted data points, any dimensions of the solution greater than three.

Row item coordinates:

| | | | | | |
|---|---|---|---|---|---|
| −0.226455 | −0.259035 | −0.439238 | −0.024631 | −0.155807 | 0.103984 |
| −0.226455 | −0.237017 | −0.167830 | −0.150105 | 0.360065 | −0.197327 |
| −0.226455 | −0.069970 | −0.099104 | −0.256088 | −0.077658 | 0.015195 |
| −0.226455 | 0.119094 | 0.241029 | −0.487546 | 0.000491 | −0.073594 |
| −0.226455 | 0.169256 | 0.188013 | 0.094604 | 0.065156 | −0.074493 |
| −0.226455 | −0.182413 | 0.401973 | 0.171045 | −0.167968 | −0.401884 |
| −0.226455 | −0.251228 | 0.182162 | 0.117289 | 0.188199 | 0.178813 |
| −0.226455 | −0.080476 | 0.163390 | −0.055092 | −0.206557 | 0.297300 |
| −0.226455 | 0.026492 | −0.021071 | 0.054859 | −0.008498 | −0.015001 |
| −0.226455 | 0.304008 | −0.224304 | −0.008171 | −0.205196 | −0.208815 |
| −0.226455 | 0.520924 | −0.025948 | 0.018164 | 0.298281 | 0.252897 |
| −0.226455 | −0.019809 | −0.152121 | 0.326062 | −0.012993 | 0.014295 |

Column item coordinates:

| | | | | | |
|---|---|---|---|---|---|
| −0.226455 | 0.349632 | −0.086517 | 0.243451 | 0.233141 | −0.030243 |
| −0.226455 | −0.098386 | 0.233458 | 0.296412 | −0.202683 | −0.000786 |
| −0.226455 | −0.110488 | 0.204082 | −0.159966 | 0.163274 | −0.164613 |
| −0.226455 | 0.246857 | 0.058274 | −0.228962 | −0.163159 | 0.134325 |
| −0.226455 | −0.222281 | −0.140119 | 0.004618 | 0.105642 | 0.275787 |
| −0.226455 | −0.074328 | −0.337984 | −0.024266 | −0.142198 | −0.232992 |

The next step is display of row and column items in a three-dimensional space. The coordinate matrix results obtained from the operations described above can be used as input for a variety of 3-D rendering engines. The one used for this particular example was 3D Webmaster, from Superscape ™, but other examples referenced herein use a 3-D library, SceneLib, author Marcus Huderic, called within a custom-written application. No limitations are implied herein as to the 3-D rendering vehicle that can be used with the invention. Whatever 3-D simulation engine is used, it will have various requirements for data input, and it has certain recommended ranges of scale corresponding to the default origins in the coordinate space and the initial default viewing range for that particular engine, within which to display objects. The working example C++ program scales the row and column coordinate matrix output from the dual-scaling operations described above to correspond to a range suitable for the 3-D simulation engine. Output from the sample data used in the working example is as follows:

Row items:

| | X | Y | Z |
|---|---|---|---|
| Francisco, San, plays | 1978000.000000 | −8500.000000 | 2222758.644726 |
| music | 1979129.170585 | 4405.571349 | 2216589.839762 |
| Johanna | 1987696.105503 | 7673.519253 | 2211379.322363 |
| fifties | 1997392.211006 | 23847.038507 | 2200000.000000 |
| Seth, City, Redwood | 1999964.755962 | 21326.082823 | 2228620.677637 |
| studying, teacher | 1981929.511923 | 31500.000000 | 2232378.783190 |
| She | 1978410.836177 | 21047.906851 | 2229765.451564 |
| her | 1987157.354697 | 20155.270880 | 2221261.031215 |
| lives, married | 1992643.170641 | 11384.055215 | 2226666.666667 |
| engineer, He, his | 2006875.505105 | 1720.203580 | 2223567.881769 |
| computer | 2018000.000000 | 11152.165646 | 2224862.572084 |
| twenties | 1990268.650458 | 5152.563569 | 2240000.000000 |

Column items:

| | | | |
|---|---|---|---|
| Seth | 2009215.308195 | 8272.054697 | 2235938.564528 |
| Floria | 1986238.520432 | 23457.046950 | 2238542.324080 |
| Rebecca | 1985618.195920 | 22090.211637 | 2216105.068515 |
| Doug | 2003944.504436 | 15156.926269 | 2212712.958351 |
| Johanna | 1979884.879075 | 5723.236233 | 2224196.616230 |
| Kiley | 1987472.622044 | −3685.309126 | 2222776.551138 |

A fundamental aspect of a preferred embodiment of the invention is that, once the Entity and Concept items have been scaled and plotted, the user can then access detailed information about each Entity or Concept by activating it in the 3-D display. Such detailed information consists of, for example, the original Description list associated with each Entity. Included in such Description lists, or attached to them, can be hyperlinks, URLs, etc., which provide immediate access to remote resources. Selecting Concept objects also highlights associated Entity objects, and vice-versa. Various scaling options and methods for visually reducing the density of the data display are available in the preferred embodiment.

Figure 2:
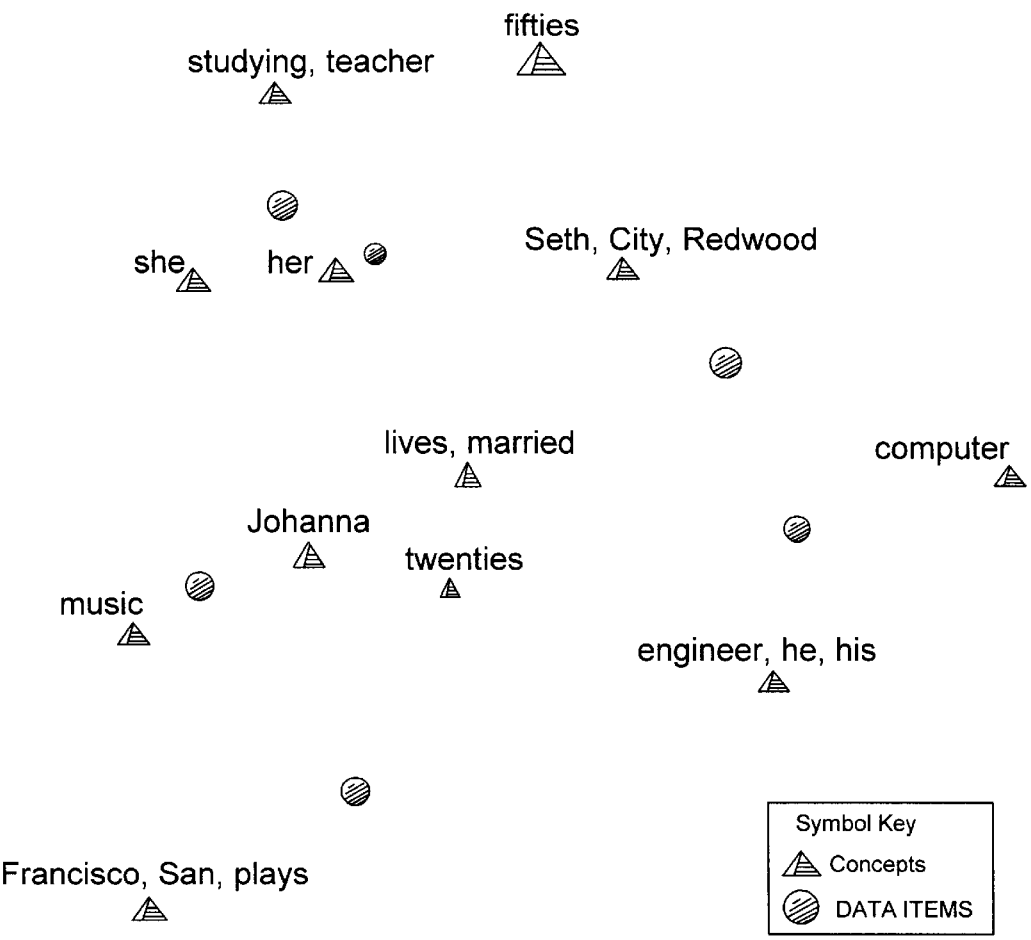

The following plots were obtained using the initial reduction to practice version of the invention. These are actual computer screen shots, but they have been rendered in the inverse for better representation on the printed page. For the purposes of the working example, pyramid shapes were used to represent Concepts and spherical shapes to represent Entities. The first plot, in FIG. 2 below, represents the initial view. The initial view was scaled in the 3-D environment such that most of the data items are visible within the user's field of view. By default, only Concept labels are initially visible, so FIG. 2 represents the set of Concept terms that bind this particular data set together. The Entities have labels also, and also have their original unique Descriptions from which the Concepts were extracted. In the present working example, these become visible when the user activates them with a mouse click.

Figure 3:
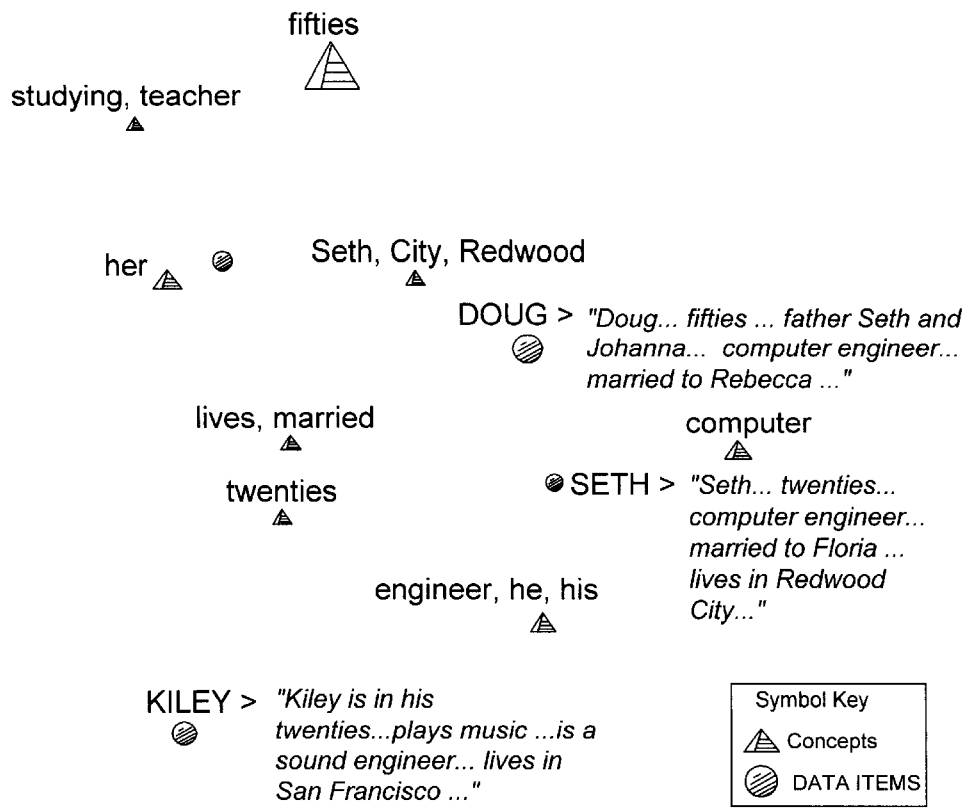

FIG. 3 illustrates another perspective on the same plot. The user's view of the environment was rotated somewhat to afford a better view of the "engineer, He, his" and "computer" Concept area of the plot. Here the closest Entities are "Doug" and "Seth", which makes intuitive sense because they are both described with the terms "computer" and "engineer" in their original Descriptions, and they are both male. "Kiley", at the lower left is also male and is also described as an "engineer", but as a "sound engineer" rather than a "computer engineer" ("sound" didn't make it as Concept in the working example because it is found only in Kiley's Description). He also lives in San Francisco, as opposed to "Doug" and "Seth" who both live in Redwood City. The similarity to the Concept "engineer" pulls the three Entities together into a common area of the plot, while their dissimilarities pull them apart along other dimensions, which causes the visual discrimination among them. The text blocks associated with "Doug", "Seth", and "Kiley" are examples of activating the detailed information associated with each Entity. In a preferred embodiment, this text block can appear anywhere, or in multiple places, on the screen and can contain large amounts of both textual and hyperlink/URL type information: it is not limited as to type. (The working example display medium has some string length limitations that do not occur with other display media.)

Figure 4:
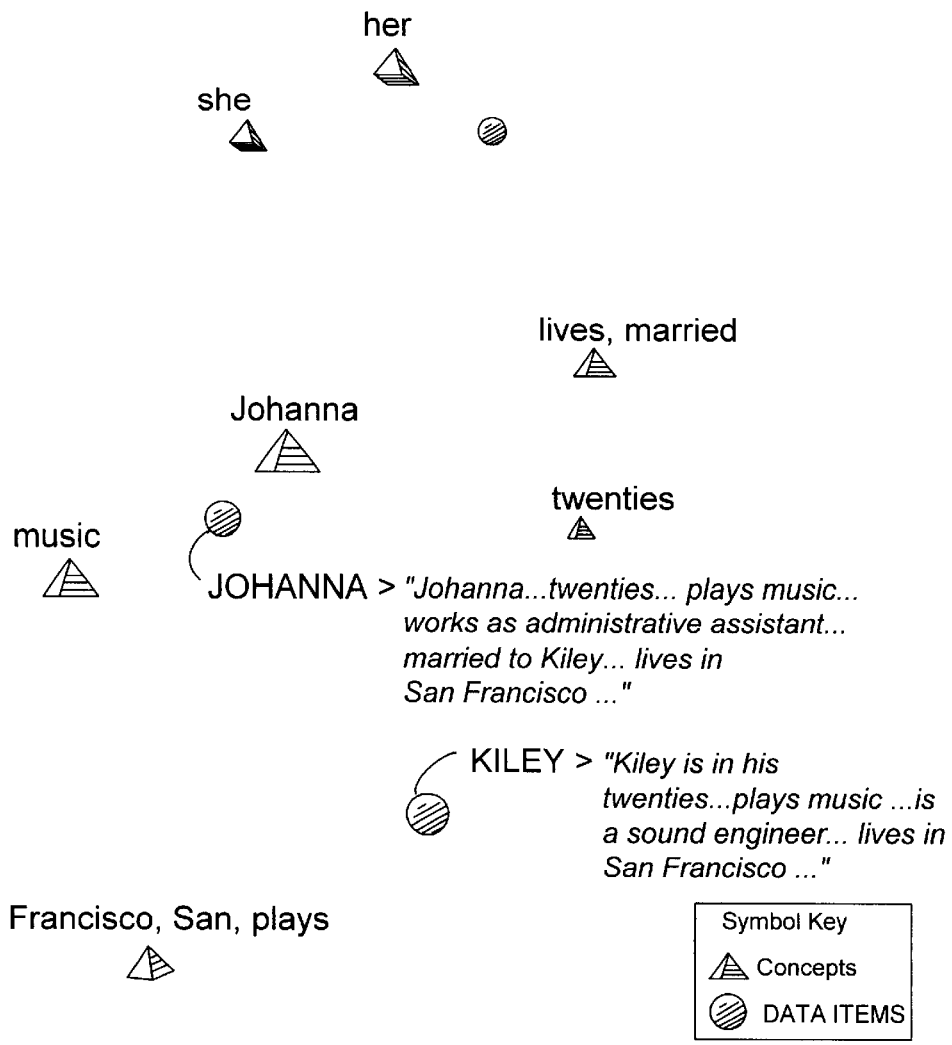

FIG. 4 provides a perspective on the "Francisco, San, plays", "music", and "Johanna" conceptual area of the map. Here we find, not surprisingly, "Johanna" and her husband "Kiley" who both play music and live in San Francisco. Note that "Johanna" is both a Concept and an Entity. A wider view of the space would show that "Johanna" as a Concept basically represents the relationship between "Kiley" (her husband), "Doug" (her father) and "Rebecca" (her mother). The position of the Entity "Johanna", represented by the sphere, is influenced by the Concepts "twenties" (her age), "She", "her", and "lives, manried", in addition to the main influences of "music", "Francisco, San, plays". "Lives, married" is an example of a Concept that applies to all Entities in the plot. If that were known or judged not important, it could be removed from consideration as a Concept, as discussed previously.

Figure 5:
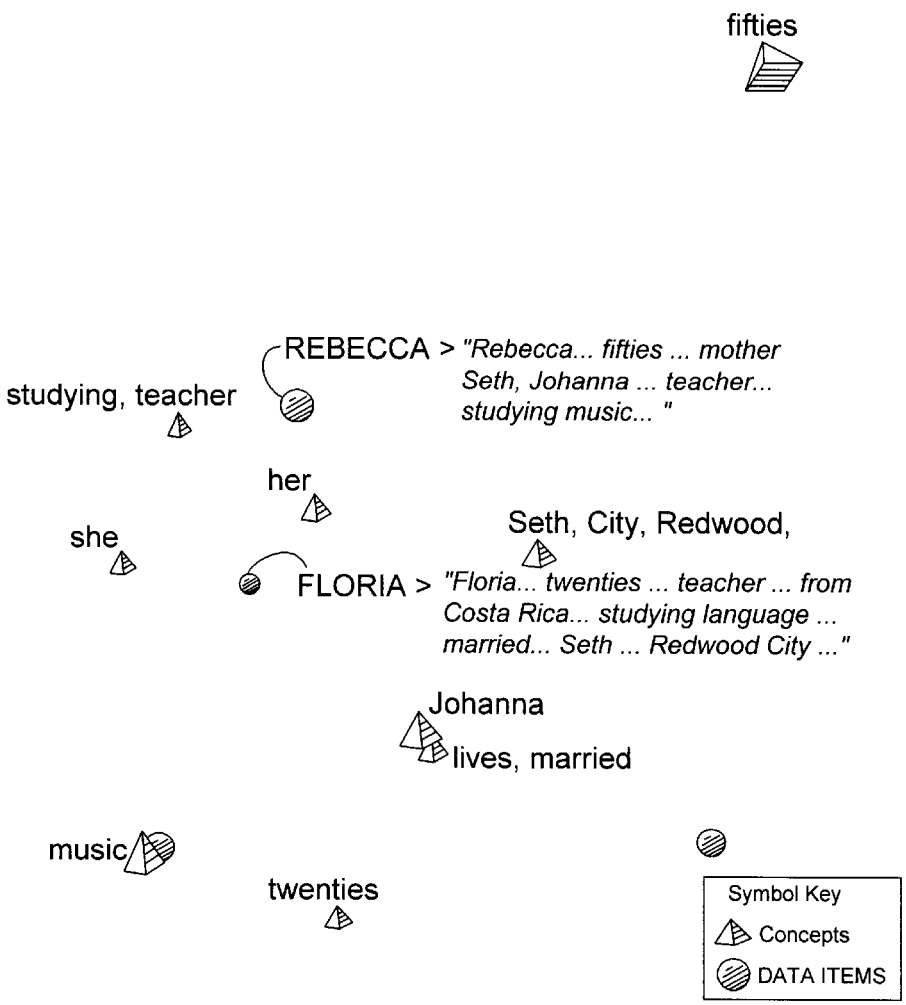
Figure 6:
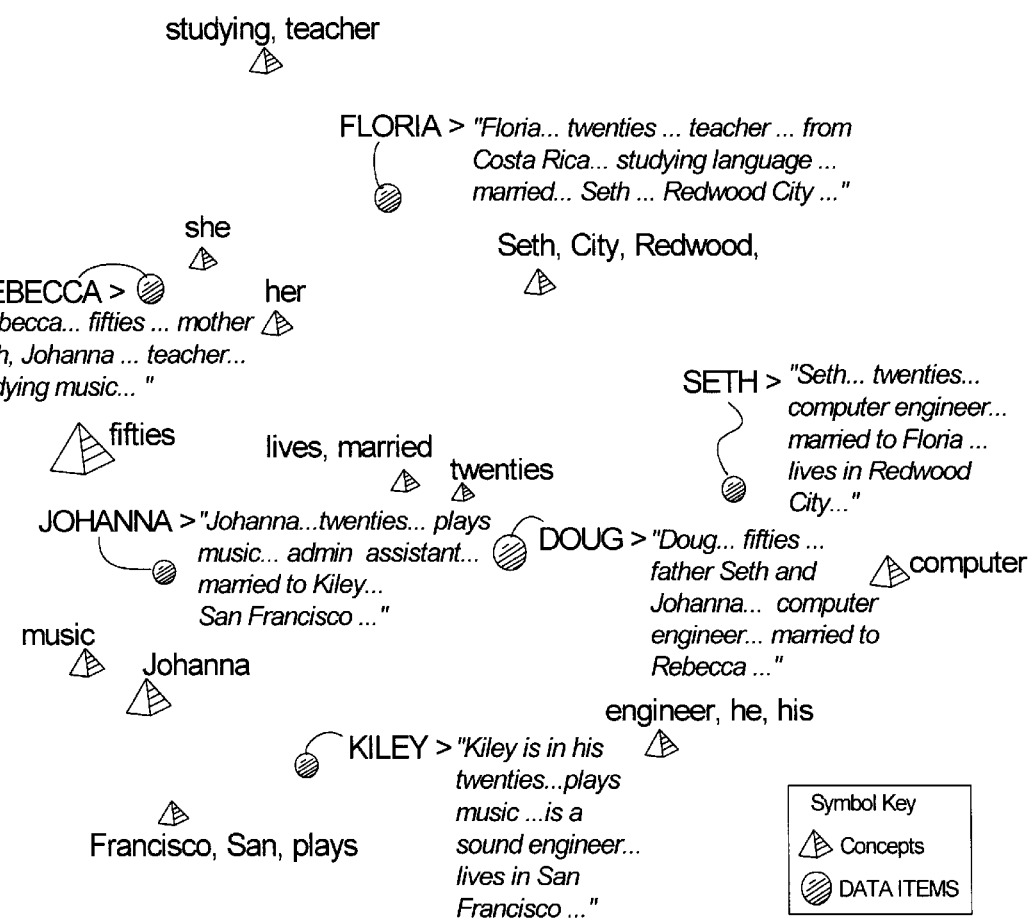

FIG. 5 is a perspective on the area of the map influenced most by the Concepts "studying, teacher", "She", and "her" (there is an option in a preferred embodiment to collapse terms like "She" and "her" to a single root term), and "City, Redwood, Seth". The nearest Entities in the general vicinity are "Floria" and "Rebecca", both of whom are teachers, both of whom are students, and both of whom live in Redwood City and are related to "Seth" (wife, mother). Note that in terms of the Z axis, the Entity "Rebecca" and the Concept "fifties" are similar in terms of relative size, which is the perceptual cue humans use to gauge distance and depth The Entity "Floria" and the Concept "twenties" (see FIG. 6) are of similar relative size, meaning that the age ranges of the people who comprise the set of Entities, "twenties" and "fifties" in this case, are discriminated along the Z axis in this particular perspective.

Figure 7:
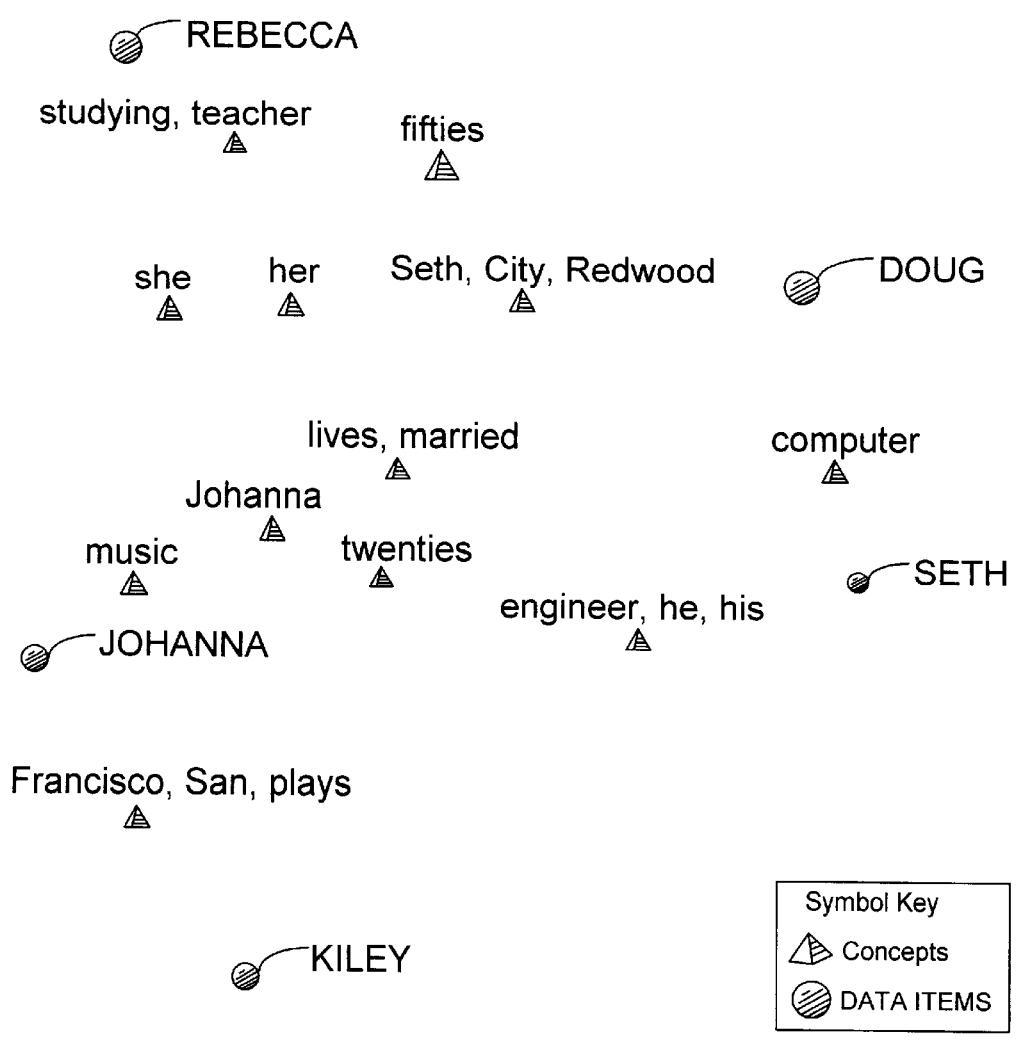
Figure 8:
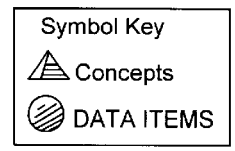

FIG. 7 and FIG. 8 represent two of a number of alternative scaling methods. FIG. 7 was rendered using the standard correspondence analysis formula for a column-centroid solution, where row items are represented as weighted centroids of the full set of column coordinates, such that the chi-square distance interpretations of interest apply primarily to the set of row items. FIG. 7 displays how a summation of the entire set of column items affects each row item, more so than how individual column items affect individual row items, which is the case with the scaling method used to produce the preceding figures. Entity labels were added manually to the plot.

FIG. 8 was rendered using the standard correspondence analysis formula for a row-centroid solution, where column items are represented as weighted centroids of the full set of row coordinates, such that the chi-square distance interpretations of interest apply primarily to the set of column items. The plot illustrates how a summation of the entire set of row items affects each column item. Entity labels have been added manually.

Working examples were also developed that illustrate the operation of a second working embodiment of the invention using different target data sets. FIG. 9, FIG. 10, FIG. 11, and FIG. 12 illustrate the output of these working examples.

Figure 9:
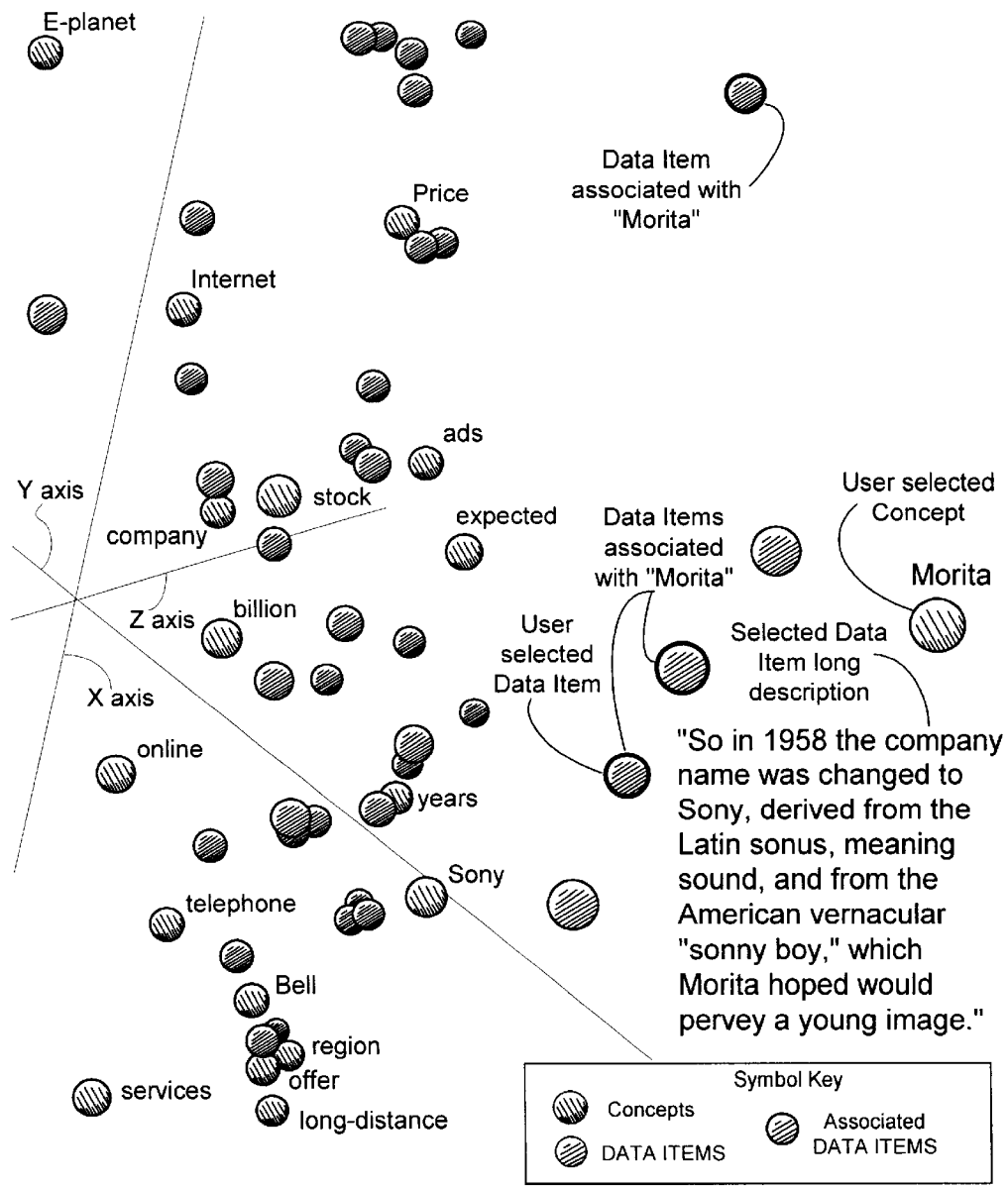

A second working example utilized a data set that consisted of the entire contents of the Business section of the New York Times for Oct. 4, 1999, which was accessed electronically from the New York Times Web site. The target data set consisted of every sentence in the fill data set which contained the word "company". To produce the target data set, a custom Perl script was written, the purpose of which was to search for a target word, such as "company", and copy any sentence in the full data set containing that target word into an Entity: Description format, in which the Entity label consisted of the location of that sentence in the full data set, or document in this case. Each sentence served as the Description of that Entity, and these were used to identify and formulate the root word Concepts. In FIG. 9, Entities were represented by the solid spheres, and Concepts were represented by wire-form spheres with text labels. In the case of this particular data set, i.e., from the New York Times business section for Oct. 4, 1999, a significant portion of the content pertained to the death of the founder of the Sony Corporation, Akio Morita. The figure represented a feature of an preferred embodiment of the invention, which is that when a Concept object was selected, in this case "Morita", any Entity terms containing a linguistic form of that Concept term were highlighted. There were three such related data objects in this example, shaded darker than other objects, one of which has been selected, which in turn displayed the sentence which comprised the Description for that data Entity. In a preferred embodiment of the invention, this Description would also include an electronic hyperlink which would take the viewer directly to the corresponding place in the original source document. This example is a screen copy of the display of the current working embodiment of the invention. It was rendered in the inverse for better representation in print. The arrow and the pointer description were manually added to the figure. Most, but not all, of the plot is shown in the example. The printed example cannot adequately convey the manner in which the ability to rotate the data space and navigate through it in various ways helps the user to recognize patterns and groupings which occurs among items in the data set.

Figure 10:
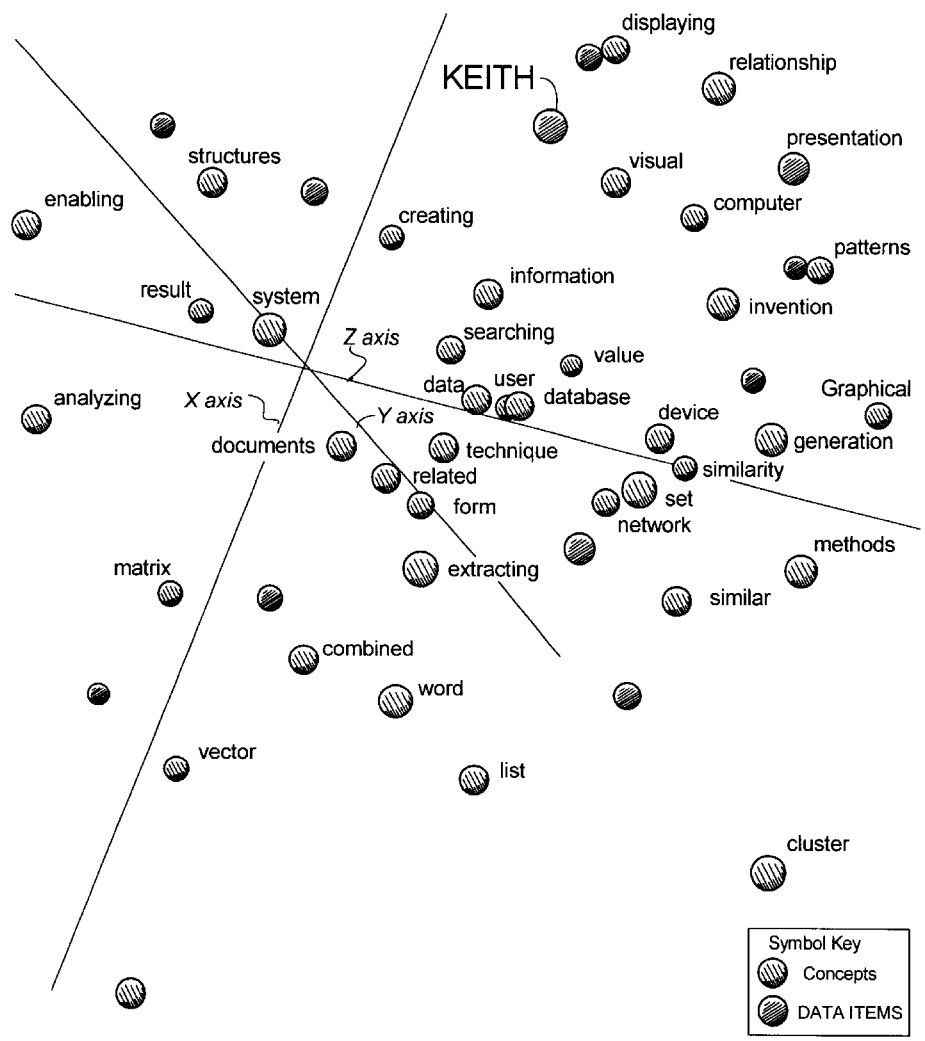
Figure 11:
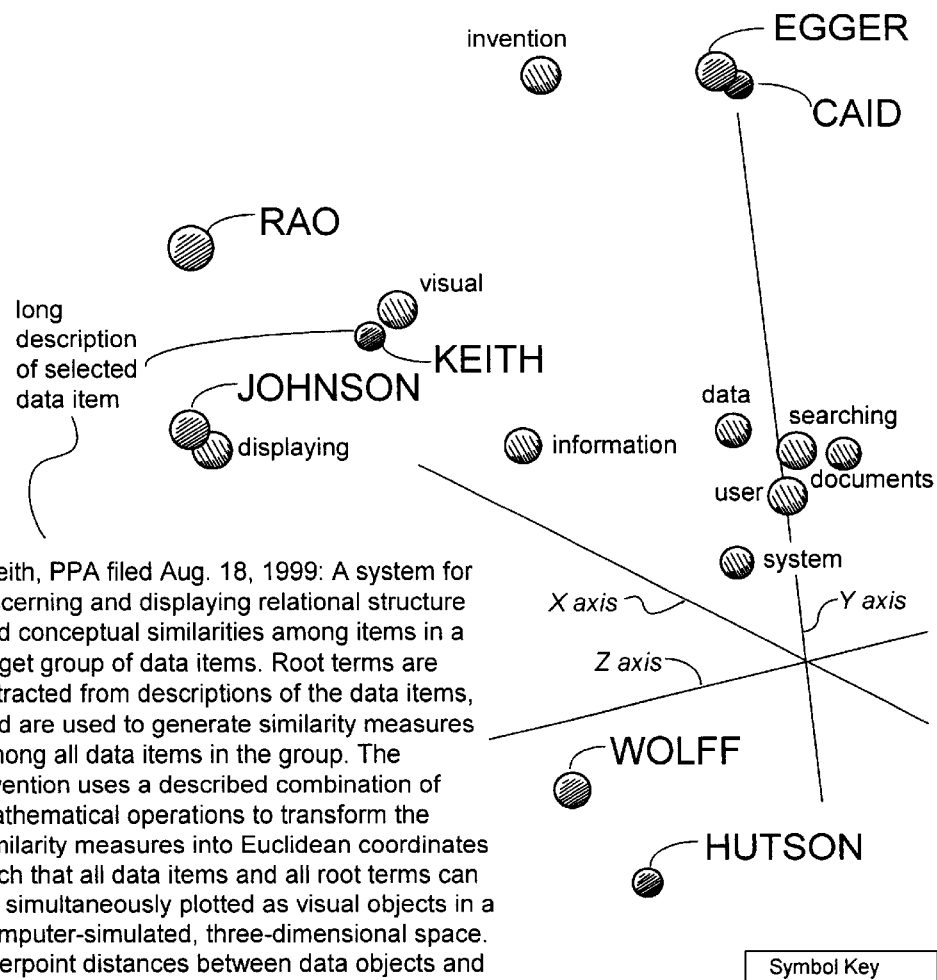

In a third working example, the full data set used to produce FIG. 10 consisted of the Abstracts of each of the background art patents referenced herein, in addition to the Abstract of this document. The figure shows one perspective on the entire resulting plot, at a density display level which displays all Concepts which were found in two or more Entity Descriptions. The label and pointer for the Entity representing the current invention, "Keith", was added manually, and can be seen in top center area of the plot. The Concepts in proximity to that Entity included "computer", "visual", "displaying", "relationship", "patterns", and information". FIG. 11 shows a portion of the entire plot which represents a different perspective on FIG. 10. The Entity object "Keith" has been selected, which displays a description associated with that Entity. In a preferred embodiment, the Description would include a hyperlink or URL allowing the viewer to directly access the source document. The solid shaded spheres in the figure represent inventions which may be more closely related to each other than to other inventions in the data set. Entity labels for the inventions have been manually added to the figure. Such a visual display provides the observer with an overview of the conceptual space occupied by each of the background art references and the subject invention, and may suggest at a glance, to the unbiased viewer, that no reference anticipates the subject invention and no combination of references renders it obvious.

Figure 12:
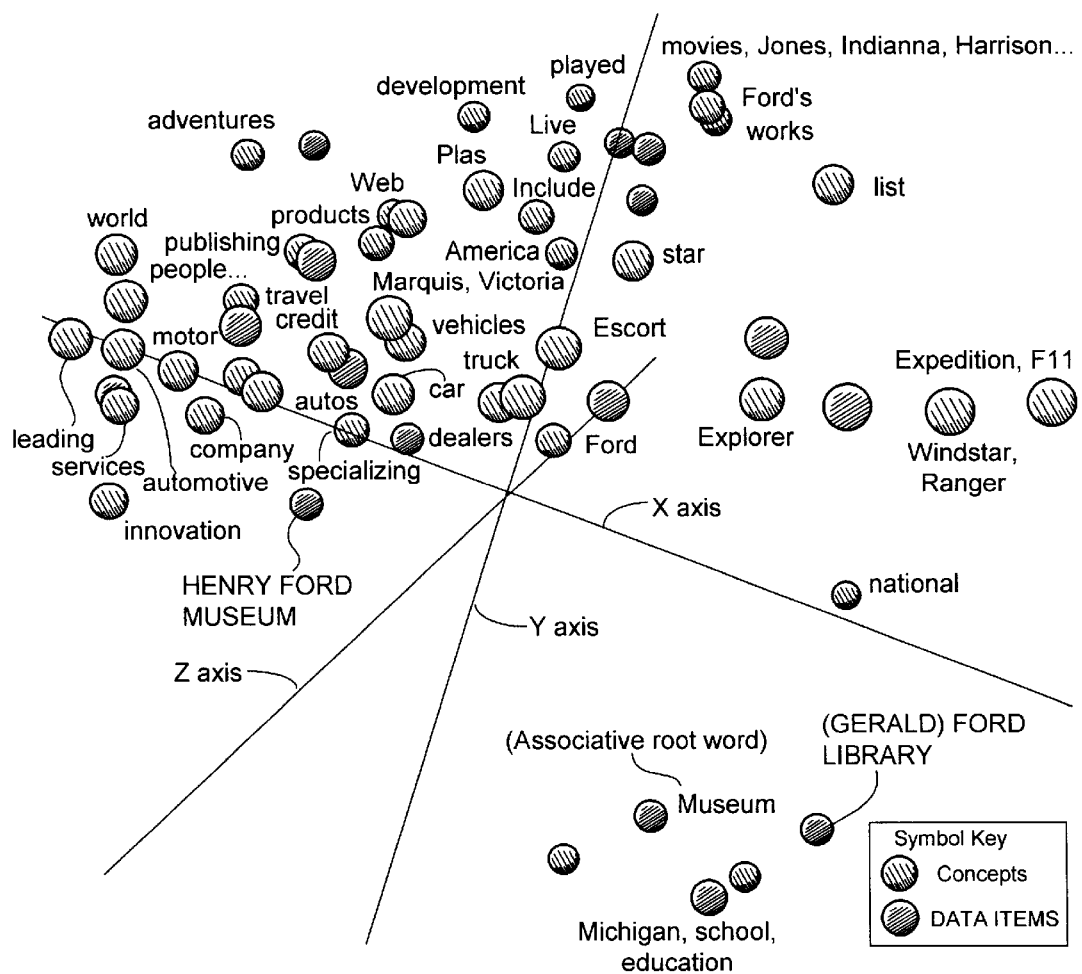

In a fourth working example, the target data set used to produce FIG. 12 was produced as follows: a search of the World Wide Web was conducted for the term "ford" using the search engine at www.google.com, a search service which provides results gathered from a variety of other Web search engines. The target data set was constructed by accessing each Web site in the first two pages of the results, and manually cutting and pasting information found in the source code of each site into Entity: Description format in the following manner: "title" fields in the Web page source code became Entity labels, and keyword", "meta", and/or "description" fields were combined to create Entity Descriptions. The total number of Web sites represented in the first two pages of results from google.com was 20. One site was written entirely in German, and was therefore eliminated from use in the example, although alternative embodiments of the present invention allow for language translation front-end processes to handle this type of situation. In two of the returned sites, keyword, meta, and description fields were not used or were not readily available to manual search, and these sites were therefore eliminated from use in the example. Alternative embodiments of the invention include front-end processing routines capable of following internal links in Web complexly structured Web sites, or other networked structures, for the purpose of retrieving descriptive information about such structures. The example figure FIG. 12 is a screen copy from the output of the most recent embodiment of the invention. In this example, the Concept object "museum" has been selected, via mouse click, which in turn highlights the two Entity objects directly associated with "museum", that is, the two Entity objects whose Descriptions contain forms of the root word "museum". (The capitalization of the word Museum" in this example is due to the operation of the current prototype software and is not preferred.) The example is intended to illustrate how providing a visual conceptual context to the viewer can help to disambiguate terms with multiple meanings such as the initiating search term "ford". Notice that the "Henry Ford Museum" is positioned closely to a large cluster of Concepts related to the automotive industry, such as "automobiles", "car", "truck", "vehicles", and so on, while the "Ford Library", dedicated to former president Gerald Ford, is in proximity to "House", "michigan, school, education", and "national". Notice also in the top right quadrant of the plot a group of items associated with Harrison Ford, the actor.

The present invention, as described above, accomplishes its object of revealing semantic context in loosely-structured data sets by directly extracting conceptual root terms from the data set, and using those terms to analyze and then visually display implicit relational structure among all data items and their descriptive conceptual terms, as interpoint distances in a three-dimensional Euclidean space. The present invention is a useful and effective method for easing the cognitive difficulty associated with processing very large amounts of information presented with little context or relational structure.

The methods and systems of the present invention result in the extraction of commonly-held root terms, or Concepts, which are implicitly contained in information associated with data items themselves, such that Concepts need not be initially specified by the user. The Concepts contribute analytically to the visual distinctions between Entity positions in the result map, and also provide semantic labels for various Entities and groups of Entities. In this way, the present invention can be used to discover previously hidden or unknown characteristics of a data set. The surfaced Concept terms also serve to differentiate between ambiguous uses and interpretations of the original search terms. The visual placement of Concepts in the map can imply the existence of semantically distinct groups of Entities in the original data set. Their distance or proximity to other Concepts in the map can imply other shades of meaning, in the sense of being like or unlike other Concepts. The rich semantically-related structure allows viewers to quickly match their subjective intentions to specific areas of the map and to focus on those Entities in proximity to the Concepts of interest. The unique Descriptions associated with each Entity can be accessed by the viewer to obtain specific information about that Entity. These include hyperlinks and URL links which serve to connect the viewer immediately with the original data source represented by that Entity object in the result map. The present invention can be applied across a broad range of circumstances in which surfacing of the implicit conceptual-relational structure among a set of items is desired.

Many variations of the invention will occur to those skilled in the art. Some variations include a computer-implemented business method that relies on the application of mathematical algorithms to a data set to extract and display associations among the data. Other variations call for a computer-implemented system for applying dual scaling algorithms to data sets to extract associations that are then displayed as a step in a business method. All such variations are intended to be within the scope and spirit of the invention.

I claim:

1. A method for facilitating recognition and understanding of relationships or associations among a set of data entities comprising:
    assembling a contingency matrix that reflects the occurrence within descriptions of the entities of concepts identified in descriptions of the entities;
    normalizing the contingency matrix to produce a normalized matrix;
    subjecting the normalized matrix to singular value decomposition to produce singular values;
    transforming the singular values to produce the coordinates for concepts and entities in a simulated three-dimensional space;
    adjusting the range of said coordinates so that said space fits in a display frame; and
    displaying concepts and entities together as objects in said space.

2. A method for extracting inherent or implicit conceptual relationships or semantic associations that exist among items in a data set, and for representing said associations in a simulated three-dimensional space, said method comprising the steps of:
    organizing said items into a plurality of entity data pairs, each entity data pair comprising a label of an entity and a textual or symbolic entity description;
    creating a set of modified entity descriptions by pruning irrelevant terms from each textual or symbolic entity description and reducing each remaining term to a linguistic root form;
    extracting concepts from said set of modified entity descriptions, each concept comprising a root term associated with at least two modified entity descriptions;
    producing a similarity matrix wherein each entity is represented as a column in said matrix and each concept is represented as a row, or vise versa, with the element at the intersection of each said column and each said row containing a binary indication of whether the corresponding concept is present in the corresponding modified entity description;
    quantifying the associative structure of the data set by subjecting the similarity matrix to procedures comprising dual-scaling, in combination with a matrix transformation, thereby producing a set of coordinates for each concept and each entity in a multi-dimensional Euclidean space; and
    displaying the concepts as one type of virtual object and the entities as a second type of virtual object with each object located at the appropriate coordinates in the multi-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

3. The method of claim 2 further comprising the step of:
    supporting a user's selection of a method modification selected from the group consisting of:
        selecting a term or type of term that may not be extracted as a concept;
        selecting a minimum number or percentage of modified entity descriptions within which a term must occur to be extracted as a concept,
        selecting a minimum number or percentage of modified entity descriptions within which a term must occur to be displayed as a concept,
        selecting threshold criteria for the selection and/or display of concepts, including a frequency of use of a given root term in a given language, and alternate representations of root terms provided by a thesaurus or other word corpus, using a statistical or mathematical procedure or algorithm which can generate chi-square or Euclidean distances between all items in two sets of variables such that all items in both sets can be simultaneously displayed in a dual-scaled plot, specifying a density of the concept and entity display by applying an alternative statistical technique, selected from the group consisting of cluster analysis or principal components analysis to a result map for the purpose of collapsing data items in the map to produce a less dense and more abstract view of the entire field of data, and selecting concepts and/or entities from the concept and entity display to be retained in subsequent samplings of a target data set.

4. A computer-readable medium having stored thereon sequences of instructions which when executed by a processor cause the processor to perform the steps of claim 2.

5. A method for operating a server computer, said server computer having a computer-readable medium having stored thereon sequences of instructions which may be executed by a processor, said method comprising the step of:

serving to a client computer having said processor the sequences of instructions that cause said processor to perform the steps of claim 2.

6. A business method comprising the steps of:

displaying to a user in a visual display implicit associations among a plurality of items in a loosely-structured data set in accordance with the method of claim 2; and generating business income by charging for a use of said visual display using a technique selected from the group consisting of:

obtaining the identity of said user, posting an advertisement of an advertiser within or in proximity to said visual display and recording within a computer memory a charge to said advertiser for said use, and charging said user a subscription or license fee in exchange for granting access to said method at a certain frequency or over a period of time.

7. An apparatus for extracting inherent or implicit conceptual relationships or semantic associations that exist among items in a data set, and for representing said associations in a simulated three-dimensional space, said apparatus comprising:

means for organizing said items into a plurality of entity data pairs, each entity data pair comprising a label of an entity and a textual or symbolic entity description;

means for creating a set of modified entity descriptions by pruning irrelevant terms from each textual or symbolic entity description and reducing each remaining term to a linguistic root form;

means for extracting concepts from said set of modified entity descriptions, each concept comprising a root term that is associated with at least two modified entity descriptions;

means for producing a similarity matrix wherein each entity is represented as a column in said matrix and each concept is represented as a row, or vise versa, with the element at the intersection of each said column and each said row containing a binary indication of whether the corresponding concept is present in the corresponding modified entity description;

means for quantifying the associative structure of the data set by subjecting the similarity matrix to procedures comprising correspondence analysis, in combination with a matrix transformation operation, thereby producing a set of coordinates for each concept and each entity in a multi-dimensional Euclidean space; and means for displaying the concepts as one type of virtual object and the entities as a second type of virtual object with each object located at the appropriate coordinates in the multi-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

8. A system for identifying and displaying inherent semantic constructs in entities in a data set with each entity comprising a web site, wherein the contents of the web pages that comprise said web site providing a description for said web site, with said constructs being held in common by more than one entity, in a manner such that the strength of semantic association between all entities and identified constructs are represented as visually-observable distances between data points in an n-dimensional Euclidean space, said system comprising:

a network of computers, said network comprising interconnected server computers and client computers, some of said server computers storing and serving web pages having contents;

means for producing a data set residing in said network, said data set comprising a plurality of data pairs, each data pair comprising a label for a web page and a textual or symbolic description of the web page;

means for creating a set of modified web site descriptions by pruning irrelevant terms from web page descriptions and reducing each remaining term to a linguistic root form;

means for extracting concepts from said modified web site descriptions residing in said network, each concept comprising a root term that is associated with more than one web site description;

means for producing a similarity matrix residing in said network, wherein each web page is represented as a column and each concept is represented as a row or vise versa, with the element at the intersection of each such column and row containing a binary indication of whether the concept is found in the corresponding web page modified description;

means for quantifying the associative structure of the data set by subjecting the similarity matrix to means for dual-scaling, in combination with auxiliary matrix transformation operations, thereby producing the coordinates of each concept and each web page in a multi-dimensional Euclidean space; and means for displaying the concepts as one type of virtual object and the web sites as a second type of virtual object with each object located at the appropriate coordinates in the multi-dimensional space, said means for displaying residing in a client computer, wherein the relative distances among the concept objects reflect the degree to which the concepts are associated with one another, wherein the relative distances among the entity objects reflect the degree to which the entities are associated with one another and wherein the relative distance between each concept object and each web site object reflects the degree to which the content of each web page is associated with each concept.

9. The system of claim 8 wherein said data set is a formal or informal, structured or unstructured data set from which entity identifiers and associated descriptions can be extracted and said data set is selected from the group consisting of:
   a result of a search of the World Wide Web produced by a search engine,
   a result of a query of a database, and
   a result of a search of a Help system.

10. The system of claim 8 wherein said means for producing is a search engine.

11. The system of claim 8 further comprising means for viewing a web page associated with a concept.

12. A computer-implemented method for displaying implicit associations among a plurality of items in a data set comprising:
   processing each item in said plurality of items to produce a plurality of item names and a plurality of item descriptions which form name-description pairs;
   extracting implicit or inherent conceptual information from said plurality of item descriptions to produce a plurality of concepts;
   quantifying conceptually-based associative relationships among said plurality of items and said plurality of concepts; and
   representing said relationships within a simulated three-dimensional visual space;
   wherein said quantifying step comprises
      producing a similarity matrix wherein each item is represented as a column in said matrix and each concept is represented as a row, or vise versa, with the element at the intersection of each said column and each said row containing an indication of the degree to which the corresponding concept is present in the corresponding modified entity description, and
      quantifying the associative structure of the data set by subjecting the similarity matrix to procedures comprising dual-scaling, in combination with a matrix transformation, thereby producing a set of coordinates for each concept and each entity in a multi-dimensional Euclidean space; and
   wherein said representing step comprises displaying the concepts as one type of virtual object and the items as a second type of virtual object with each object located at the appropriate coordinates in the three-dimensional space, wherein the relative distance between each pair of concept objects reflects the degree to which the concepts are associated with one another, wherein the relative distance between each pair of item objects reflects the degree to which the items are associated with one another and wherein the relative distance between each concept object and each item object reflects the degree to which each item is associated with each concept.

13. A computer-readable medium having stored thereon sequences of instructions which when executed by a processor cause the processor to perform the steps of claim 12.

14. A computer-implemented system for displaying implicit associations among a plurality of items in a data set comprising:
   means for processing each item in said plurality of items to produce a plurality of item names and a plurality of item descriptions which form name-description pairs;
   means for extracting implicit or inherent conceptual information from said plurality of item descriptions to produce a plurality of concepts;
   means for quantifying conceptually-based associative relationships among said plurality of items and said plurality of concepts; and
   means for representing said relationships within a simulated three-dimensional visual space;
   wherein said means for quantifying comprises
      means for producing a similarity matrix wherein each item is represented as a column in said matrix and each concept is represented as a row, or vise versa, with the element at the intersection of each said column and each said row containing an indication of whether the corresponding concept is present in the corresponding modified entity description, and
      means for quantifying the associative structure of the data set by subjecting the similarity matrix to procedures comprising dual-scaling, in combination with a matrix transformation, thereby producing a set of coordinates for each concept and each entity in a multi-dimensional Euclidean space; and
   wherein said means for representing comprises means for displaying the concepts as one type of virtual object and the items as a second type of virtual object with each object located at the appropriate coordinates in the three-dimensional space, wherein the relative distance between each pair of concept objects reflects the degree to which the concepts are associated with one another, wherein the relative distance between each pair of item objects reflects the degree to which the items are associated with one another and wherein the relative distance between each concept object and each item object reflects the degree to which each item is associated with each concept.

15. A computer-implemented method for displaying implicit associations among a plurality of items in a data set comprising:
   processing each item in said plurality of items to produce a plurality of item names and a plurality of item descriptions which form name-description pairs;
   extracting implicit or inherent conceptual information from said plurality of item descriptions to produce a plurality of concepts;
   quantifying conceptually-based associative relationships among said plurality of items and said plurality of concepts by means of a dual-scaling algorithm; and
   representing said relationships within a simulated three-dimensional visual space;
   wherein said representing step comprises displaying the concepts as one type of virtual object and the items as a second type of virtual object with each object located at the appropriate coordinates in the three-dimensional space, wherein the relative distance between each pair of concept objects reflects the degree to which the concepts are associated with one another, wherein the relative distance between each pair of item objects reflects the degree to which the items are associated with one another and wherein the relative distance between each concept object and each item object reflects the degree to which each item is associated with each concept.

16. A computer-readable medium having stored thereon sequences of instructions which when executed by a processor cause the processor to perform the steps of claim 15.

17. A computer-implemented system for displaying implicit associations among a plurality of items in a data set comprising:
 means for processing each item in said plurality of items to produce a plurality of item names and a plurality of item descriptions which form name-description pairs;
 means for extracting implicit or inherent conceptual information from said plurality of item descriptions to produce a plurality of concepts;
 means for quantifying conceptually-based associative relationships among said plurality of items and said plurality of concepts by means of a dual-scaling algorithm; and
 means for representing said relationships within a simulated three-dimensional visual space;
 wherein said means for representing comprises means for displaying the concepts as one type of virtual object and the items as a second type of virtual object with each object located at the appropriate coordinates in the three-dimensional space, wherein the relative distance between each pair of concept objects reflects the degree to which the concepts are associated with one another, wherein the relative distance between each pair of item objects reflects the degree to which the items are associated with one another and wherein the relative distance between each concept object and each item object reflects the degree to which each item is associated with each concept.

18. A computer-implemented method for displaying implicit associations among a plurality of items in a data set comprising:
 processing each item in said plurality of items to produce a plurality of item names and a plurality of item descriptions which form name-description pairs;
 extracting implicit or inherent conceptual information from said plurality of item descriptions to produce a plurality of concepts;
 quantifying conceptually-based associative relationships among said plurality of items; and
 representing said relationships within a simulated three-dimensional visual space;
 wherein said quantifying step comprises
  producing a similarity matrix wherein each item is represented as a column in said matrix and each concept is represented as a row, or vise versa, with the element at the intersection of each said column and each said row containing an indication of whether the corresponding concept is present in the corresponding modified entity description, and
  quantifying the associative structure of the data set by subjecting the similarity matrix to procedures comprising dual-scaling, in combination with a matrix transformation, thereby producing a set of coordinates for each concept and each entity in a multi-dimensional Euclidean space.

19. A computer-readable medium having stored thereon sequences of instructions which when executed by a processor cause the processor to perform the steps of claim 18.

20. A computer-implemented system for displaying implicit associations among a plurality of items in a data set comprising:
 means for processing each item in said plurality of items to produce a plurality of item names and a plurality of item descriptions which form name-description pairs;
 means for extracting implicit or inherent conceptual information from said plurality of item descriptions to produce a plurality of concepts;
 means for quantifying conceptually-based associative relationships among said plurality of items; and
 means for representing said relationships within a simulated three-dimensional visual space;
 wherein said means for quantifying comprises
  means for producing a similarity matrix wherein each item is represented as a column in said matrix and each concept is represented as a row, or vise versa, with the element at the intersection of each said column and each said row containing an indication of the degree to which the corresponding concept is present in the corresponding modified entity description, and
  means for quantifying the associative structure of the data set by subjecting the similarity matrix to procedures comprising dual-scaling, in combination with a matrix transformation, thereby producing a set of coordinates for each concept and each entity in a multi-dimensional Euclidean space.

21. A method for facilitating recognition and understanding of relationships or associations among a set of data entities comprising:
 assembling a contingency matrix that reflects the occurrence within descriptions of the entities of concepts identified in descriptions of the entities;
 normalizing the contingency matrix to produce a normalized matrix;
 subjecting the normalized matrix to singular value decomposition to produce singular values;
 transforming the singular values to produce the coordinates for concept and entities in a simulated three-dimensional space;
 adjusting the range of said coordinates so that said space fits in a display frame; and
 displaying concepts and entities as objects in said space;
 wherein said assembling step comprises producing a contingency matrix wherein each entity is represented as a column in said matrix and each concept is represented as a row, or vise versa, with the element at the intersection of each said column and each said row containing an indication of whether the corresponding concept is present in the corresponding modified entity description;
 wherein said subjecting step and transforming step comprise quantifying the associative structure of the data set by subjecting the contingency matrix to procedures comprising dual-scaling, in combination with a matrix transformation, thereby producing a set of coordinates for each concept and each entity in a three-dimensional Euclidean space; and
 wherein said displaying step comprises displaying the concepts as one type of virtual object and the entities as a second type of virtual object with each object located at the appropriate coordinates in the three-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

22. A computer-readable medium having stored thereon sequences of instructions which when executed by a processor cause the processor to perform the steps of claim 21.

23. A computer-readable medium having stored thereon sequences of instructions which when executed by a processor cause the processor to perform the steps of:
acquiring a data set comprised of items;
organizing the items into a plurality of data pairs, each data pair comprising an entity and a description of the entity;
creating a set of modified entity descriptions by pruning irrelevant terms from entity description lists and reducing each remaining term to a linguistic root form;
extracting concepts from said set of modified entity descriptions, each concept comprising a root term that is associated with more than one modified entity description;
producing a contingency matrix wherein each entity is a column and each concept is a row or vise versa, with the element of each such column and row containing an indication of whether the concept is associated with the corresponding modified entity description;
quantifying the associative structure of the data set by manipulating the contingency matrix as follows:
collapsing identical row profiles and combining the concept terms associated with each row profile into a single complex term, and
subjecting the contingency matrix to singular value decomposition and another mathematical operation to produce an n-dimensional representation of the contingency matrix in Euclidean space;
scaling said raw coordinates to produce coordinates of each concept and each entity usable in a given three-dimensional display space; and
displaying each concept as a concept object and each entity as an entity object on said monitor or projection device with each object located at the appropriate coordinates in the three-dimensional space, wherein the relative distances among the concept objects reflect the degree to which the concepts are associated with one another, wherein the relative distances among the entity objects reflect the degree to which the entities are associated with one another and wherein the relative distance between each concept object and each entity object reflects the degree to which each entity is associated with each concept.

24. A system for facilitating recognition and understanding of relationships or associations among a set of data entities comprising:
means for assembling a contingency matrix that reflects the occurrence within descriptions of the entities of concepts identified in descriptions of the entities;
means for normalizing the contingency matrix to produce a normalized matrix;
means for subjecting the normalized matrix to singular value decomposition to produce singular values;
means for transforming the singular values to produce the coordinates for concept and entities in a simulated three-dimensional space;
means for adjusting the range of said coordinates so that said space fits in a display frame; and
means for displaying concepts and entities as objects in said space;
wherein said means for assembling comprises means for producing a contingency matrix wherein each entity is represented as a column in said matrix and each concept is represented as a row, or vise versa, with the element at the intersection of each said column and each said row containing an indication of whether the corresponding concept is present in the corresponding modified entity description;
wherein said means for subjecting and means for transforming comprise means for quantifying the associative structure of the data set that is operative to subject the contingency matrix to means for dual-scaling, in combination with means for matrix transformation, thereby producing a set of coordinates for each concept and each entity in a three-dimensional Euclidean space; and
wherein said means for displaying comprises means for displaying the concepts as one type of virtual object and the entities as a second type of virtual object with each object located at the appropriate coordinates in the three-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

25. A method for facilitating recognition and understanding of relationships or associations among a set of data entities comprising:
assembling a contingency matrix that reflects the occurrence within descriptions of the entities of concepts identified in descriptions of the entities;
normalizing the contingency matrix to produce a normalized matrix;
subjecting the normalized matrix to singular value decomposition to produce singular values;
transforming the singular values to produce the coordinates for concept and entities in a simulated three-dimensional space;
adjusting the range of said coordinates so that said space fits in a display frame; and
displaying concepts and entities as objects in said space;
wherein said displaying step comprises displaying the concepts as one type of virtual object and the entities as a second type of virtual object with each object located at the appropriate coordinates in the three-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

26. A system for facilitating recognition and understanding of relationships or associations among a set of data entities comprising:
means for assembling a contingency matrix that reflects the occurrence within descriptions of the entities of concepts identified in descriptions of the entities;
means for normalizing the contingency matrix to produce a normalized matrix;
means for subjecting the normalized matrix to singular value decomposition to produce singular values;
means for transforming the singular values to produce the coordinates for concept and entities in a simulated three-dimensional space;

means for adjusting the range of said coordinates so that said space fits in a display frame; and means for displaying concepts and entities as objects in said space;

wherein said means for displaying comprises means for displaying the concepts as one type of virtual object and the entities as a second type of virtual object with each object located at the appropriate coordinates in the three-dimensional space, wherein the relative distance between each pair of concept objects reflects the degree to which the concepts are associated with one another, wherein the relative distance between each pair of entity objects reflects the degree to which the entities are associated with one another and wherein the relative distance between each concept object and each entity object reflects the degree to which each entity is associated with each concept.

27. A method for facilitating recognition and understanding of relationships or associations among a set of data entities comprising:

assembling a contingency matrix that reflects the occurrence within descriptions of the entities of concepts identified in descriptions of the entities;

normalizing the contingency matrix to produce a normalized matrix;

subjecting the normalized matrix to singular value decomposition to produce singular values;

transforming the singular values to produce the coordinates for concept and entities in a simulated three-dimensional space;

adjusting the range of said coordinates so that said space fits in a display frame; and displaying concepts and entities as objects in said space;

wherein said assembling step comprises producing a contingency matrix wherein each entity is represented as a column in said matrix and each concept is represented as a row, or vise versa, with the element at the intersection of each said column and each said row containing an indication of whether the corresponding concept is present in the corresponding modified entity description; and wherein said subjecting step and transforming step comprise quantifying the associative structure of the data set by subjecting the contingency matrix to procedures comprising dual-scaling, in combination with a matrix transformation, thereby producing a set of coordinates for each concept and each entity in a three-dimensional Euclidean space.

28. A system for facilitating recognition and understanding of relationships or associations among a set of data entities comprising:

means for assembling a contingency matrix that reflects the occurrence within descriptions of the entities of concepts identified in descriptions of the entities;

means for normalizing the contingency matrix to produce a normalized matrix;

means for subjecting the normalized matrix to singular value decomposition to produce singular values;

means for transforming the singular values to produce the coordinates for concept and entities in a simulated three-dimensional space;

means for adjusting the range of said coordinates so that said space fits in a display frame; and means for displaying concepts and entities as objects in said space;

wherein said means for assembling comprises means for producing a contingency matrix wherein each entity is represented as a column in said matrix and each concept is represented as a row, or vise versa, with the element at the intersection of each said column and each said row containing an indication of whether the corresponding concept is present in the corresponding modified entity description; and wherein said means for subjecting and means for transforming comprise means for quantifying the associative structure of the data set that is operative to subject the contingency matrix to means for dual-scaling, in combination with means for matrix transformation, thereby producing a set of coordinates for each concept and each entity in a three-dimensional Euclidean space.

29. A computer-implemented method for displaying implicit associations among a plurality of items in a data set comprising the steps of:

processing each item in said plurality of items to produce a plurality of item names and a plurality of item descriptions which form unlinked name-description pairs;

extracting implicit or inherent conceptual information from said plurality of item descriptions;

quantifying conceptually-based associative relationships among said plurality of items by means of a dual-scaling algorithm; and representing said relationships within a simulated three-dimensional visual space that contains representation of each item;

wherein the representation of each item is hyperlinked to the item.

30. A computer-implemented system for displaying implicit associations among a plurality of items in a data set comprising the steps of:

means for processing each item in said plurality of items to produce a plurality of item names and a plurality of item descriptions which form name-description pairs;

means for extracting implicit or inherent conceptual information from said plurality of item descriptions to produce unlinked concepts that comprise a word or group of words that is associated with at least two of the items;

means for quantifying conceptually-based associative relationships among said plurality of items by means of a dual-scaling algorithm; and means for representing said relationships within a simulated three-dimensional visual space.

31. A computer-implemented method for displaying implicit associations among a plurality of items in a data set to a user, said method comprising:

a step for processing each item in said plurality of items to produce a plurality of item names and a plurality of item descriptions which form name-description pairs;

a step for extracting implicit or inherent conceptual information from said plurality of item descriptions to produce concepts that are not connected to one another by navigable links;

a step for quantifying conceptually-based associative relationships among said plurality of items and concepts by means of a dual-scaling algorithm; and a step for representing said relationships within a simulated three-dimensional visual space in which the degree to which the concepts and the items are related to one another is indicated to the user by Euclidian distances between the concepts and the items and in which the concepts and the items are not connected or organized in a hierarchical, taxonomic structure.

32. A method for facilitating recognition and understanding of relationships or associations among a set of data entities comprising:

assembling a contingency matrix that reflects the occurrence within descriptions of the entities of concepts identified in descriptions of the entities;

normalizing the contingency matrix to produce a normalized matrix;

subjecting the normalized matrix to singular value decomposition to produce singular values;

transforming the singular values to produce the coordinates for concepts and entities in a simulated three-dimensional space;

adjusting the range of said coordinates so that said space fits in a display frame; and displaying concepts and entities as objects in said space in which the degree to which the concepts and the items are related to one another is indicated to the user by Euclidian distances between each two objects.

* * * * *